(12) United States Patent
Sakaguchi et al.

(10) Patent No.: US 12,522,679 B2
(45) Date of Patent: Jan. 13, 2026

(54) METHOD FOR PRODUCING FLUORORESIN

(71) Applicant: TOSOH CORPORATION, Shunan (JP)

(72) Inventors: Kota Sakaguchi, Yokkaichi (JP); Kazunari Iwanaga, Yokkaichi (JP); Tomoya Shimono, Yokkaichi (JP); Tomonari Nagai, Yokkaichi (JP); Hiroshi Yamakawa, Yokkaichi (JP)

(73) Assignee: TOSOH CORPORATION, Shunan (JP)

( * ) Notice: Subject to any disclaimer, the term of this patent is extended or adjusted under 35 U.S.C. 154(b) by 643 days.

(21) Appl. No.: 17/907,123

(22) PCT Filed: Mar. 24, 2021

(86) PCT No.: PCT/JP2021/012248
§ 371 (c)(1),
(2) Date: Sep. 23, 2022

(87) PCT Pub. No.: WO2021/193717
PCT Pub. Date: Sep. 30, 2021

(65) Prior Publication Data
US 2023/0118752 A1    Apr. 20, 2023

(30) Foreign Application Priority Data

Mar. 26, 2020  (JP) ................................. 2020-055770
Mar. 26, 2020  (JP) ................................. 2020-055776

(51) Int. Cl.
*C08F 214/18*    (2006.01)
*C08F 2/06*       (2006.01)

(52) U.S. Cl.
CPC ............ *C08F 214/182* (2013.01); *C08F 2/06* (2013.01); *C08F 2810/40* (2013.01)

(58) Field of Classification Search
CPC .................................................. C08F 214/182
See application file for complete search history.

(56) References Cited

U.S. PATENT DOCUMENTS

| | | | |
|---|---|---|---|
| 3,308,107 | A | 3/1967 | Selman et al. |
| 3,816,553 | A | 6/1974 | Smart |

(Continued)

FOREIGN PATENT DOCUMENTS

| | | |
|---|---|---|
| CN | 101466744 A | 6/2009 |
| CN | 109689638 A | 4/2019 |

(Continued)

OTHER PUBLICATIONS

International Search Report issued Jun. 8, 2021 in PCT/JP2021/012248 filed Mar. 24, 2021, 3 pages.

(Continued)

*Primary Examiner* — Catherine S Branch
(74) *Attorney, Agent, or Firm* — Oblon, McClelland, Maier & Neustadt, L.L.P.

(57) ABSTRACT

The present invention pertains to: a fluororesin that includes a residue unit represented by formula (1), and a terminal group represented by formula (2); and a fluororesin that includes a residue unit represented by formula (1) and has a transmittance of 50% or more measured at an optical path length of 10 mm and a wavelength of 275 nm when dissolved in perfluorohexane to produce a 10 wt % perfluorohexane solution.

(Continued)

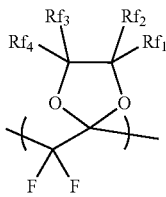

(1)

In formula (1): $Rf_1$, $Rf_2$, $Rf_3$, and $Rf_4$ each independently represent one selected from the group consisting of fluorine atoms, C1-7 linear perfluoroalkyl groups, C3-7 branched perfluoroalkyl groups, or C3-7 cyclic perfluoroalkyl groups; the perfluoroalkyl groups may have an etheric oxygen atom; $Rf_1$, $Rf_2$, $Rf_3$, and $Rf_4$ may bond to each other to form a ring having 4 to 8 carbon atoms; and the ring may include an etheric oxygen atom.

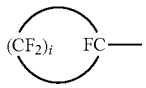

(2)

In formula (2), i is an integer of 3-20. The present invention provides: a fluororesin that includes an oxolane ring, has suppressed yellowing after heating and melting, and especially has reduced discoloration, even in molding of thick products; and a method for producing said fluororesin.

6 Claims, 1 Drawing Sheet

(56) References Cited

U.S. PATENT DOCUMENTS

| | | | |
|---|---|---|---|
| 3,872,066 | A | 3/1975 | Smart |
| 8,828,121 | B1 | 9/2014 | He et al. |
| 2002/0128411 | A1 | 9/2002 | Navarrini et al. |
| 2005/0148800 | A1 | 7/2005 | Hwang et al. |
| 2006/0099476 | A1 | 5/2006 | Watakabe et al. |
| 2006/0281883 | A1 | 12/2006 | Sugiyama |
| 2006/0287497 | A1 | 12/2006 | Tayanagi et al. |
| 2007/0043187 | A1 | 2/2007 | Okamoto et al. |
| 2008/0306232 | A1 | 12/2008 | Yamamoto et al. |
| 2009/0118429 | A1 | 5/2009 | Sugiyama et al. |
| 2009/0215938 | A1 | 8/2009 | Tayanagi et al. |
| 2009/0292093 | A1 | 11/2009 | Matsuura et al. |
| 2010/0304271 | A1 | 12/2010 | Hommura et al. |
| 2011/0027687 | A1 | 2/2011 | Hommura et al. |
| 2011/0027688 | A1 | 2/2011 | Hommura et al. |

FOREIGN PATENT DOCUMENTS

| | | | |
|---|---|---|---|
| EP | 2 821 846 | A1 | 1/2015 |
| JP | 49-134654 | | 12/1974 |
| JP | 50-35299 | | 4/1975 |
| JP | 11-49749 | A | 2/1999 |
| JP | 2000-1511 | A | 1/2000 |
| JP | 2002-332275 | A | 11/2002 |
| JP | 2004-59763 | A | 2/2004 |
| JP | 2005-42046 | A | 2/2005 |
| JP | 2005-314388 | A | 11/2005 |
| JP | 2007-504125 | A | 3/2007 |
| JP | 2010-195937 | A | 9/2010 |
| JP | 2017-510451 | A | 4/2017 |
| JP | 2020-23688 | A | 2/2020 |
| WO | WO 2004/066426 | A1 | 8/2004 |
| WO | WO 2005/021526 | A2 | 3/2005 |
| WO | WO 2005/021526 | A3 | 3/2005 |
| WO | WO 2007/086478 | A1 | 8/2007 |
| WO | WO 2007/145181 | A1 | 12/2007 |
| WO | WO 2008/075545 | A1 | 6/2008 |
| WO | WO 2010/137627 | A1 | 12/2010 |
| WO | WO 2011/013577 | A1 | 2/2011 |
| WO | WO 2011/013578 | A1 | 2/2011 |
| WO | WO 2013/129501 | A1 | 9/2013 |
| WO | WO 2015/126920 | A1 | 8/2015 |

OTHER PUBLICATIONS

International Preliminary Report on Patentability and Written Opinion issued Oct. 6, 2022 in PCT/JP2021/012248, 6 pages.
Kotaro Koike, et al., "Synthesis and characterization of copolymers of perfluoro(2-methylene-4,5-dimethyl-1,3-dioxolane) and perfluoro(2-methylene-1,3-dioxolane)," Journal of Fluorine Chemistry, vol. 156, 2013, pp. 198-202.
František Mikeš, et al., "Synthesis and Characterization of an Amorphous Perfluoropolymer: Poly(perfluoro-2-methylene-4-methyl-1,3-dioxolane)," Macromolecules, vol. 38, No. 10, 2005, pp. 4237-4245.
Masaru Nakamura, et al., "Development of Perfluoro Transparent Resins Obtained by Radical Cyclopolymerization for Leading-edge Electronic and Optical Applications," Journal of the Chemical Society of Japan, No. 12, 2001, pp. 659-668 (with English Abstract).
Office Action issued Dec. 3, 2024, in corresponding Japanese Patent Application No. 2023-202065 (with English Translation), 8 pages.
Japanese Notice of Allowance issued Jan. 7, 2025, in corresponding Japanese Patent Application No. 2021-049845 (with English Translation), 3 pages.
Japanese Notice of Allowance issued Jan. 7, 2025, in corresponding Japanese Patent Application No. 2021-049844 (with English Translation), 3 pages.
Japanese Office Action issued Jan. 7, 2025, in corresponding Japanese Patent Application No. 2023-202064 (with English Translation), 5 pages.
Combined Chinese Office Action and Search Report issued Sep. 14, 2023, in corresponding Chinese Patent Application No. 202180023912.9 (with English Translation), 18 pages.
Extended European Search Report issued Mar. 13, 2024 in European Patent Application No. 21775775.6, 7 pages.
Indian Office Action issued Mar. 12, 2025 in Indian Patent Application No. 202217059085, 6 pages.

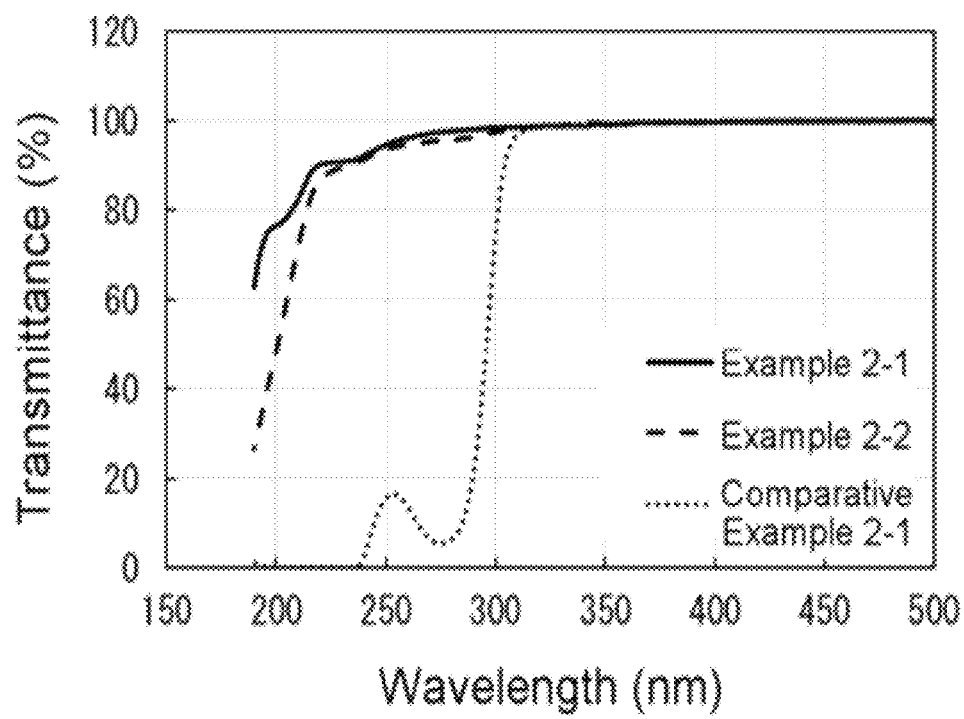

METHOD FOR PRODUCING FLUORORESIN

CROSS-REFERENCE TO RELATED APPLICATIONS

The present application is a 35 U.S.C. § 371 national stage patent application of International patent application PCT/JP2021/012248, filed on Mar. 24, 2021, which is based on and claims the benefits of priority to Japanese Application No. 2020-055770, filed on Mar. 26, 2020 and Japanese Application No. 2020-055776, filed on Mar. 26, 2020. The entire contents of all of the above applications are incorporated herein by reference.

TECHNICAL FIELD

The present invention relates to a fluororesin and a method for producing the same. The present invention includes the first and second aspects which relate to a fluororesin and a method for producing the same.

CROSS-REFERENCE TO RELATED APPLICATIONS

This application claims priority to Japanese Patent Application No. 2020-055770 filed on Mar. 26, 2020, Japanese Patent Application No. 2020-055776 filed on Mar. 26, 2020, and entire descriptions thereof are incorporated herein as if specifically disclosed herein.

BACKGROUND ART

Fluororesins are used as protective films for semiconductors and other electronic components, water repellent films for inkjet printer heads, waterproof and oilproof coatings for filters, optical components, and other applications because of their superior heat resistance, electrical properties, chemical resistance, waterproofness, liquid-repellent and oil-repellent properties, and optical properties.

Among the fluororesins, those including an oxolane ring have a bulky ring structure, and are therefore amorphous and have high transparency and high heat resistance. In addition, since such resins are composed only of carbon, fluorine, and oxygen, they have high electrical characteristics, chemical resistance, waterproofness, and liquid-repellent and oil-repellent properties. Furthermore, since the resins are amorphous, they can be melt-molded.

NPL 1 describes the synthesis and properties of a polymer (poly-PFMMD) obtained by polymerization of perfluoro-2-methylene-4-methyl-1,3-dioxolane (PFMMD) using perfluorobenzoyl peroxide as a radical polymerization initiator, which is a kind of fluororesin including an oxolane ring. Poly-PFMMD has excellent heat resistance. According to the inventors' study, the poly-PFMMD described in NLP 1 exhibited significant yellowing after heat-melting and molding. The yellowing was especially significant in thick molded products. Therefore, there is a great need for a technology that can produce high transparency with less coloration, even in thick molded body of poly-PFMMD.

The above background technology is common to the first and second aspects of the invention.

[Non-Patent Literature (NPL) 1] Macromolecules 2005, 38, 4237-4245

[Non-Patent Literature (NPL) 2] Journal of the Chemical Society of Japan, 2001, No. 12, 659-668

SUMMARY OF INVENTION

Problems to be Solved by the Invention

First Aspect of the Present Invention

A method for obtaining a fluororesin having an aliphatic perfluoroalkyl terminal group by using an aliphatic all-fluorine initiator is known as a method for reducing the coloring of a fluororesin during heating. For example, NPL 2 reports an example of cyclization polymerization of perfluoro(butenyl vinyl ether) by bulk polymerization using $(CF_3CF_2CF_2COO)_2$.

However, according to the study by the present inventors, it cannot be said that yellowing of poly-PFMMD after heating and melt molding was sufficiently reduced even when the technique described in NPL 2 was used for the synthesis of poly-PFMMD. In addition, the yield was extremely poor, the productivity was inferior, and the molecular weight distribution Mw/Mn was large.

The first aspect of the present invention is intended to solve the problems in a fluororesin including an oxolane ring. Specifically, it is an object of the present invention to provide a fluororesin including an oxolane ring in which yellowing after heating and melting is suppressed, and in particular, coloring is reduced even in the molding of a thick product, and a method for producing the same.

Second Aspect of the Present Invention

NPL 1 did not clearly describe a method for producing a fluororesin including an oxolane ring in which yellowing after heating and melt molding is suppressed and which excels in yield and productivity and has a narrow molecular weight distribution Mw/Mn.

The second aspect of the present invention is intended to solve the problems in a fluororesin including an oxolane ring. Specifically, it is an object to provide a fluororesin including an oxolane ring in which yellowing after heating and melting is suppressed, and in particular, coloring is reduced even in the molding of a thick product, and a method for producing the same.

Means for Solution to Problem

First Aspect of the Present Invention

As a result of diligent studies, the present inventors have found that a fluororesin including an oxolane ring having a terminal group of a specific structure can solve the above-mentioned problems, and this finding led to the completion of the present invention.

That is, the first aspect of the present invention is as follows.

[1-1]

A fluororesin comprising a residue unit represented by a following formula (1) and a terminal group represented by a following formula (2).

[C1]

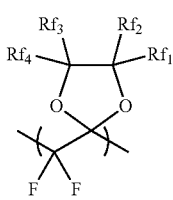
(1)

(In the formula (1), $Rf_1$, $Rf_2$, $Rf_3$ and $Rf_4$ each independently represent one of the groups consisting of a fluorine atom, a linear perfluoroalkyl group having 1 to 7 carbon atoms, a branched perfluoroalkyl group having 3 to 7 carbon atoms, and a cyclic perfluoroalkyl group having 3 to 7 carbon atoms, the perfluoroalkyl group may have an ethereal oxygen atom, $Rf_1$, $Rf_2$, $Rf_3$ and $Rf_4$ may be linked to each other to form a ring having 4 or more and 8 or less carbon atoms, and the ring may include an ethereal oxygen atom.)

[C2]

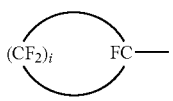
(2)

(In the formula (2), i is an integer of 3 to 20.)

[1-2]

The fluororesin according to [1-1], wherein the terminal group represented by the formula (2) has a structure represented by a following formula (3).

[C3]

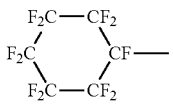
(3)

[1-3]

The fluororesin according to [1-1] or [1-2], which shows a peak showing a maximum in a range of −140 ppm or more and −142 ppm or less and a peak showing a maximum in a range of −143 or more and −145 ppm or less in solid-state $^{19}$F-NMR spectral analysis.

[1-4]

The fluororesin according to any one of [1-1] to [1-3], wherein the fluororesin is in the form of powder and has a volume average particle diameter of 1 μm to 1000 μm.

[1-5]

A method for producing a fluororesin according to any one of [1-1] to [1-4], comprising a step of polymerizing a mixture including a radical polymerization initiator represented by a following formula (4) and a monomer represented by a following formula (5).

[C4]

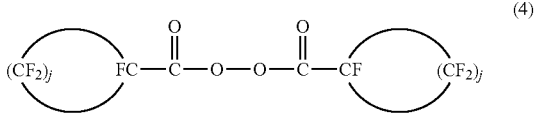
(4)

(In the formula (4), j is an integer of 3 to 20.)

[C5]

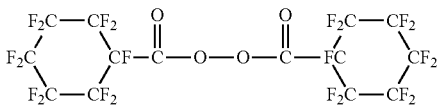
(5)

(In the formula (5), $Rf_5$, $Rf_6$, $Rf_7$ and $Rf_8$ each independently represent one of the groups consisting of a fluorine atom, a linear perfluoroalkyl group having 1 to 7 carbon atoms, a branched perfluoroalkyl group having 3 to 7 carbon atoms, and a cyclic perfluoroalkyl group having 3 to 7 carbon atoms, the perfluoroalkyl group may have an ethereal oxygen atom, $Rf_5$, $Rf_6$, $Rf_7$ and $Rf_8$ may be linked to each other to form a ring having 4 or more and 8 or less carbon atoms, and the ring may include an ethereal oxygen atom.)

[1-6]

The method for producing a fluororesin according to [1-5], wherein the radical polymerization initiator represented by the formula (4) is a radical polymerization initiator represented by a following formula (6).

[C6]

(6)

$$F_2C-CF_2 \quad\quad O \quad\quad\quad O \quad F_2C-CF_2$$
$$F_2C \quad\quad\quad CF-C-O-O-C-FC \quad\quad\quad CF_2$$
$$F_2C-CF_2 \quad\quad\quad\quad\quad\quad\quad F_2C-CF_2$$

[1-7]

The method for producing a fluororesin according to [1-5] or [1-6], wherein in the step of polymerizing, the mixture is further mixed with an organic solvent, and in the organic solvent, at least the monomer is dissolved and at least a part of the resin produced by the polymerization is not dissolved, resulting in precipitation of the resin, and the resin produced by the polymerization precipitates as particles in the organic solvent.

Second Aspect of the Present Invention

As a result of diligent studies, the present inventors have found that a fluororesin having a small light absorption and a high transmittance at a wavelength of 275 nm can solve the abovementioned problems, and this finding led to the completion of the present invention.

That is, the second aspect of the present invention is as follows.

[2-1]

A fluororesin including a residue unit represented by a following formula (1) and, when dissolved in perfluorohexane to obtain a 10 wt % perfluorohexane solution, having a transmittance of 50% or more as measured at an optical path length thereof of 10 mm and a wavelength of 275 nm.

[C7]

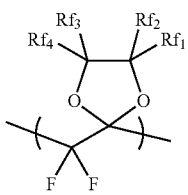

(1)

(In the formula (1), $Rf_1$, $Rf_2$, $Rf_3$ and $Rf_4$ each independently represent one of the groups consisting of a fluorine atom, a linear perfluoroalkyl group having 1 to 7 carbon atoms, a branched perfluoroalkyl group having 3 to 7 carbon atoms, and a cyclic perfluoroalkyl group having 3 to 7 carbon atoms, the perfluoroalkyl group may have an ethereal oxygen atom, $Rf_1$, $Rf_2$, $Rf_3$ and $Rf_4$ may be linked to each other to form a ring having 4 or more and 8 or less carbon atoms, and the ring may include an ethereal oxygen atom.)

[2-2]

The fluororesin according to [2-1] in which, when the fluororesin is dissolved in perfluorohexane to obtain a 10 wt % perfluorohexane solution, no peak showing a minimum is observed in a transmission spectrum at an optical path length thereof of 10 mm and a wavelength of 250 nm to 300 nm.

[2-3]

The fluororesin according to [2-1] or [2-2], wherein the fluororesin is in the form of powder and has a volume average particle diameter of 1 μm to 1000 μm.

[2-4]

The method for producing the fluororesin according to any one of [2-1] to [2-3], comprising a step of polymerizing a mixture including a radical polymerization initiator represented by a following formula (2) and a monomer represented by a following formula (3).

[C8]

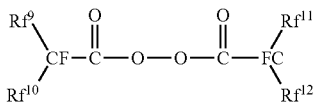

(2)

(In the formula (2), $Rf^9$, $Rf^{10}$, $Rf^{11}$, and $Rf^{12}$ each independently represent a perfluoroalkyl group having 1 to 20 carbon atoms, the perfluoroalkyl group may have an ethereal oxygen atom, $Rf^9$ and $Rf^{10}$ may be linked to each other to form a ring having 4 or more and 20 or less carbon atoms, $Rf^{11}$ and $Rf^{12}$ may be linked to each other to form a ring having 4 or more and 20 or less carbon atoms, and the ring may include an ethereal oxygen atom.)

[C9]

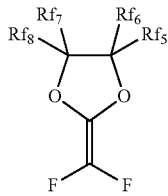

(3)

(In the formula (3), $Rf_5$, $Rf_6$, $Rf_7$ and $Rf_8$ each independently represent one of the groups consisting of a fluorine atom, a linear perfluoroalkyl group having 1 to 7 carbon atoms, a branched perfluoroalkyl group having 3 to 7 carbon atoms, and a cyclic perfluoroalkyl group having 3 to 7 carbon atoms, the perfluoroalkyl group may have an ethereal oxygen atom, $Rf_5$, $Rf_6$, $Rf_7$ and $Rf_8$ may be linked to each other to form a ring having 4 or more and 8 or less carbon atoms, and the ring may include an ethereal oxygen atom.)

[2-5]

The method for producing a fluororesin according to [2-4], wherein the radical polymerization initiator represented by the formula (2) is a radical polymerization initiator represented by a following formula (4).

[C10]

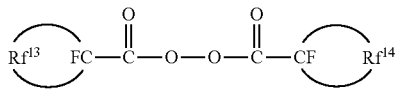

(4)

(In the formula (4), $Rf^{13}$ and $Rf^{14}$ each independently represent a perfluoroalkyl group having 3 to 20 carbon atoms, and the perfluoroalkyl group may have an ethereal oxygen atom.)

[2-6]

The method for producing a fluororesin according to [2-4] or [2-5], wherein
in the step of polymerizing, the mixture is further mixed with an organic solvent, and
in the organic solvent, at least the monomer is dissolved and at least a part of the resin produced by the polymerization is not dissolved, resulting in precipitation of the resin, and the resin produced by the polymerization precipitates as particles in the organic solvent.

Advantageous Effects of Invention

According to the first aspect of the present invention, it is possible to provide a fluororesin including an oxolane ring in which yellowing when performing melt molding of a thick molded product is suppressed, and a method for producing the same.

According to the second aspect of the present invention, it is possible to provide a fluororesin including an oxolane ring in which yellowing when performing melt molding of a thick molded product is suppressed, and a method for producing the same.

BRIEF DESCRIPTION OF DRAWINGS

FIGURE shows transmission spectra at an optical path length of 10 mm for a 10 wt % fluororesin-perfluorohexane solution in Example 2-1, Example 2-2 and Comparative Example 2-1.

DESCRIPTION OF EMBODIMENTS

The numbers assigned to chemical formulas shown in the first aspect of the present invention and the numbers assigned to chemical formulas shown in the second aspect of the present invention are independent of each other, and the same chemical formulas may be assigned with different numbers.

First Aspect of the Present Invention

The fluororesin, which is one aspect of the present invention, will be described in detail hereinbelow. The fluororesin of the present invention in the following description means the fluororesin of the first aspect of the present invention.

The fluororesin of the first aspect of the present invention comprises a residue unit represented by the following formula (1) and a terminal group represented by the following formula (2).

[C11]

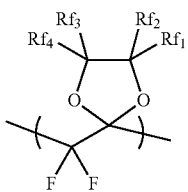
(1)

(In the formula (1), $Rf_1$, $Rf_2$, $Rf_3$ and $Rf_4$ each independently represent one of the groups consisting of a fluorine atom, a linear perfluoroalkyl group having 1 to 7 carbon atoms, a branched perfluoroalkyl group having 3 to 7 carbon atoms, and a cyclic perfluoroalkyl group having 3 to 7 carbon atoms, the perfluoroalkyl group may have an ethereal oxygen atom, $Rf_1$, $Rf_2$, $Rf_3$ and $Rf_4$ may be linked to each other to form a ring having 4 or more and 8 or less carbon atoms, and the ring may include an ethereal oxygen atom.)

[C12]

(2)

(In the formula (2), i is an integer of 3 to 20.)

Since the fluororesin of the present invention has a bulky ring structure included in the specific formula (1), the fluororesin is amorphous and has high transparency and high heat resistance. In addition, as a result of being composed only of carbon atoms, fluorine atoms, and oxygen atoms, the fluororesin has high electrical characteristics, chemical resistance, waterproofness, and liquid-repellent and oil-repellent properties.

The $Rf_1$, $Rf_2$, $Rf_3$, and $Rf_4$ groups each independently represent one of the groups consisting of a fluorine atom, a linear perfluoroalkyl group having 1 to 7 carbon atoms, a branched perfluoroalkyl group having 3 to 7 carbon atoms, and a cyclic perfluoroalkyl group having 3 to 7 carbon atoms. The perfluoroalkyl group may have an ethereal oxygen atom. $Rf_1$, $Rf_2$, $Rf_3$ and $Rf_4$ may be linked to each other to form a ring having 4 or more and 8 or less carbon atoms, and the ring may include an ethereal oxygen atom.

Examples of the linear perfluoroalkyl group having 1 to 7 carbon atoms include a trifluoromethyl group, a pentafluoroethyl group, a heptafluoropropyl group, a nonafluorobutyl group, an undecafluoropentyl group, a tridecafluorohexyl group, and a pentadecafluoroheptyl group.

Examples of the branched perfluoroalkyl group having 3 to 7 carbon atoms include a heptafluoroisopropyl group, a nonafluoroisobutyl group, a nonafluoro sec-butyl group, and a nonafluoro tert-butyl group.

Examples of the cyclic perfluoroalkyl group having 3 to 7 carbon atoms include a heptafluorocyclopropyl group, a nonafluorocyclobutyl group, and a tridecafluorocyclohexyl group.

Examples of the linear perfluoroalkyl group which has 1 to 7 carbon atoms and may have an ethereal oxygen atom include a —$CF_2OCF_3$ group, a —$(CF_2)_2OCF_3$ group, and a —$(CF_2)_2OCF_2CF_3$ group.

Examples of the cyclic perfluoroalkyl group which has 3 to 7 carbon atoms and may have an ethereal oxygen atom include a 2-(2,3,3,4,4,5,5,6,6-decafluoro)-pyrinyl group, a 4-(2,3,3,4,4,5,5,6,6-decafluoro)-pyrinyl group, and a 2-(2,3,3,4,4,5,5-heptafluoro)-furanyl group.

It is preferable that at least one of $Rf_1$, $Rf_2$, $Rf_3$ and $Rf_4$ be one of the groups consisting of a linear perfluoroalkyl group having 1 to 7 carbon atoms, a branched perfluoroalkyl group having 3 to 7 carbon atoms, and a cyclic perfluoroalkyl group having 3 to 7 carbon atoms. Because of this, the fluororesin of the present invention exhibits excellent heat resistance.

Examples of the residue unit represented by the formula (1) include residue units represented by the following formula (3).

[C13]

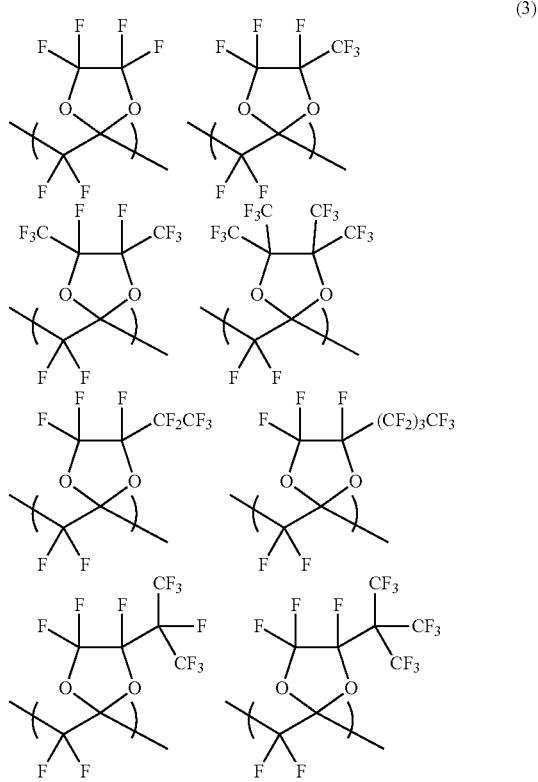
(3)

-continued

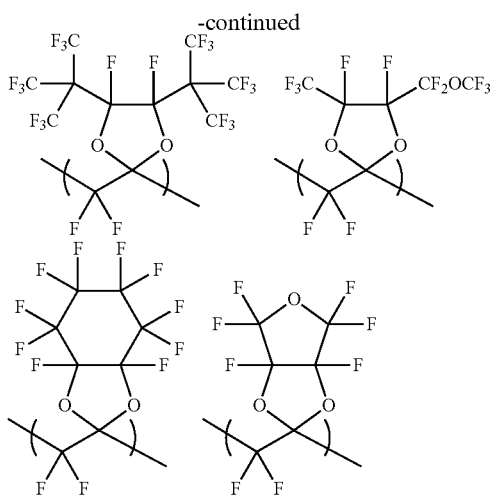

Among these, resin particles including residue units represented by the following formula (4) are preferable because they are excellent in heat resistance and molding processability, and a resin including perfluoro(4-methyl-2-methylene-1,3-dioxolane) residue unit is more preferable.

[C14]

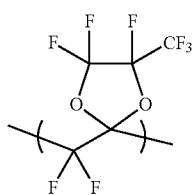
(4)

The fluororesin of the present invention includes a terminal group represented by the following formula (2). As a result, yellowing when performing melt molding of a thick molded product is suppressed.

Here, the "terminal group" means a group present at the end of the main chain of the polymer.

The terminal group represented by the formula (2) preferably has a structure represented by a following formula (5).

[C15]

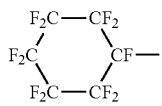
(5)

For example, the following method can be used to confirm that the fluororesin of the present invention includes a terminal group unit represented by the formula (5).

That is, where it can be confirmed that a peak showing a maximum in a range of −140 ppm or more and −142 ppm or less and a peak showing a maximum in a range of −143 ppm or more and −145 ppm or less are shown in solid-state $^{19}$F-NMR spectral analysis of the fluororesin of the present invention, it can be determined that the fluororesin has a terminal group represented by the formula (5). The peaks showing maximums in the ranges of −140 ppm or more and −142 ppm or less and −143 ppm or more and −145 ppm or less are attributed to the —CF$_2$— groups at the 3-position, 4-position, and 5-position in the formula (5).

For the solid-state $^{19}$F-NMR measurement of the fluororesin, a general $^{19}$F-NMR measuring device may be used. For example, a method for implementing the solid-state $^{19}$F-NMR measurement can be exemplified by a method using VNMRS-400 manufactured by Varian, using a 1.6 mm FASTMAS probe at a magnetic field strength of 376.18 MHz (19F), setting a pulse width of 1.3 ρs, a spectrum width of 250 kHz (664.6 ppm), a spectrum center of −120 ppm, a waiting time of 10 sec, a MAS rotation speed of 39 kHz, and an integration number of 2048 times in a Hahn-echo method, taking PTFE (−122.0 ppm) as a reference, and using about 10 mg of the fluororesin.

In the solid-state $^{19}$F-NMR spectral analysis of the fluororesin of the present invention, the integrated value of the area of the terminal peak (6F) due to the terminal group showing a maximum in the ranges of −140 ppm or more and −142 ppm or less and −143 ppm or more and −145 ppm or less is in total preferably 0.001 to 10, more preferably 0.01 to 5, and even more preferably 0.05 to 5 with respect to the integrated value of 500 of the area of the main chain peak (5F) showing the maximum at the position of −81 ppm. As a result, the yellowing of the fluororesin is further suppressed. Here, the main chain peak (5F) showing the maximum at the position of −81 ppm is attributed to the —CF$_2$O— group and the —CF$_3$ group.

For example, solid-state $^{13}$C-NMR measurement of the oligomer of the fluororesin can be also used to confirm that the fluororesin of the present invention includes a residue unit represented by the formula (2) or the formula (5). For example, an oligomer or the like dissolved in a solvent such as ZEORORA H in the manufacturing process is isolated, and solid-state $^{13}$C-NMR measurement is performed on the obtained oligomer. At this time, where a peak showing a maximum in the range of 90 ppm to 92 ppm that is derived from the F atom at the 1-position of the perfluorocycloalkyl group directly bonded to the residue unit represented by the formula (1) is observed, it can be confirmed that the fluororesin includes a terminal group represented by the formula (2) or the formula (5).

It is preferable that the terminal group represented by the formula (2) or the formula (5) be directly bonded, rather than by another functional group, to the residue unit represented by the general formula (1). Further, it is preferable that the fluororesin of the present invention does not contain a carbonyl group.

The fluororesin of the present invention preferably has a weight average molecular weight Mw in the range of $5 \times 10^4$ to $3 \times 10^5$. Where the weight average molecular weight Mw is in this range, the melt molding processability and the defoaming property at the time of melting are excellent. Further, where the weight average molecular weight Mw is in this range, fewer cracks occur at the time of heating and cooling. From the viewpoint of excellent melt molding processability and excellent defoaming property at the time of melting, it is more preferable that the fluororesin of the present invention have the weight average molecular weight Mw in the range of $5 \times 10^4$ to $2 \times 10^5$.

The weight average molecular weight Mw of the fluororesin according to the present invention can be determined by using gel permission chromatography (GPC), using, for example, standard polymethyl methacrylate having a known molecular weight as a standard sample, using a solvent capable of dissolving both the standard sample and the fluororesin as an eluant, and calculating from the elution time of the sample and the standard sample and the molecular weight of the standard sample. The solution can be exemplified by a solution obtained by adding 10% by weight of 1,1,1,3,3,3-hexafluoro-2-propanol (Wako Pure Chemical Industries, Ltd.) to ASAHIKLIN AK-225 (manufactured by Asahi Glass Co., Ltd.).

The molecular weight distribution Mw/Mn, which is the ratio of the weight average molecular weight Mw to the number average molecular weight Mn, of the fluororesin according to the present invention, is not particularly limited, but from the viewpoint of suppression of yellowing after heating and melting, excellent melt molding processability, excellent defoaming property at the time of melting, and less crack generation during heating and cooling, the molecular weight distribution Mw/Mn is preferably 1.2 to 8, more preferably 1.2 to 5, still more preferably 1.5 to 3, and even more preferably 2.0 to 3. The number average molecular weight Mn can be measured by the same method as the above-mentioned method for measuring the weight average molecular weight Mw, and the molecular weight distribution Mw/Mn can be calculated by dividing the weight average molecular weight Mw by the number average molecular weight Mn.

The yellowness index (YI) of the fluororesin of the present invention that is measured in the diameter direction on a thick melt-molded product (a columnar molded body having a diameter of 10 mm and a height of about 17 mm that is molded by heating and melting at 280° C. for 24 h in a test tube) is preferably 10 or less, more preferably 4 or less, and still more preferably 3 or less. According to the present inventors, where melt molding of a thick molded product is performed in a closed state, yellowing after heating and melt molding of the fluororesin becomes remarkable as compared with heating in an open environment. A method for evaluating the yellowness and coloring of a thick melt-molded product may be exemplified by a method for evaluating the yellowness index (YI) measured in the diameter direction of a columnar body (diameter 10 mm and height about 17 mm) obtained by melting and molding 3 g of the fluororesin of the present invention by heating at 280° C. for 24 h in a test tube having an outer diameter of 13 mm. Here, the diameter direction is the vertical direction when the test tube is laid down sideways on a desk or the like. The yellowness index can be measured by laying down the test tube, which still includes the obtained resin molded product, sideways on white paper, taking a digital photograph from above, reading RGB values of the molded product with software from the obtained image, obtaining tristimulus values X, Y, and Z of an XYZ color system by substituting the read-out RGB values into the following equations, and calculating the yellowness index (YI) in a C light source (auxiliary illuminant C) from X, Y, and Z according to the method of JIS K 7373.

$X=0.4124R+0.3576G+0.1805B$, $Y=0.2126R+0.7152G+0.0722B$, $Z=0.0193R+0.1192G+0.9505B$.

The fluororesin of the present invention preferably has a yellowness index (YI) of 1 or less in a flaky melt-molded product (thickness 3 mm, molded by heating and melting at 280° C. for 24 h in a petri dish). Examples of the molding method and the evaluation method include the methods described in Examples.

The fluororesin of the present invention may include other monomer residue units, and examples of the other monomer residue units include tetrafluoroethylene (TFE), hexafluoropropylene (HFP), chlorotrifluoroethylene (CTFE), trifluoroethylene, hexafluoroisobutylene, perfluoroalkylethylene, fluorovinyl ether, vinyl fluoride (VF), vinylidene fluoride (VDF), perfluoro-2,2-dimethyl-1,3-dioxol (PDD), perfluoro (allyl vinyl ether), perfluoro(butenyl vinyl ether), and the like.

The particle diameter of the fluororesin of the present invention is not particularly limited, but the volume average particle diameter is preferably 1 μm to 1,000 μm, more preferably 1 μm to 500 μm, and even more preferably 1 μm to 300 μm, because the resin powder has high fluidity, enables continuous feeding to molding machines, etc., suppresses solvent residue in the resin, increases bulk density and fillability, and provides excellent handling during the molding process.

The volume average particle diameter of the fluororesin of the present invention can be evaluated by measuring the particle diameter distribution (volume distribution) by a laser diffraction/scattering method. The particle diameter distribution determined by the laser diffraction/scattering method can be measured by dispersing the resin particles in water or an organic solvent such as methanol. As a laser scatterometer, Microtrack manufactured by Microtrack Bell Co., Ltd. can be exemplified.

The volume average particle diameter is also called a Mean Volume Diameter, which is an average particle diameter expressed on a volume basis. Where the particle diameter distribution is divided for each particle diameter channel, the representative particle diameter value of each particle diameter channel is d, and the volume-based percentage for each particle diameter channel is v, the volume average particle diameter is represented by $\Sigma(vd)/\Sigma(v)$.

The fluororesin of the present invention is preferably in the form of powder and has a volume average particle diameter of 1 μm to 1000 μm.

The method for producing a fluororesin, which is one aspect of the present invention, will be described in detail hereinbelow.

The fluororesin of the present invention can be produced by polymerizing a mixture including a radical polymerization initiator represented by the following formula (6) and a monomer represented by the following formula (7).

[C16]

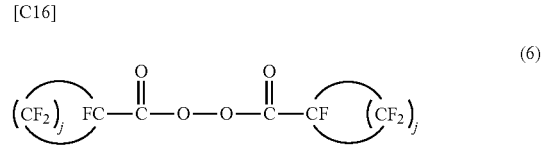

(6)

(In the formula (6), j is an integer of 3 to 20.)

[C18]

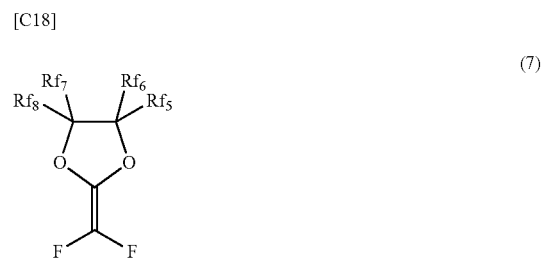

(7)

(In the formula (7), $Rf_5$, $Rf_6$, $Rf_7$ and $Rf_8$ each independently represent one of the groups consisting of a fluorine atom, a linear perfluoroalkyl group having 1 to 7 carbon atoms, a branched perfluoroalkyl group having 3 to 7 carbon atoms, and a cyclic perfluoroalkyl group having 3 to 7 carbon atoms, the perfluoroalkyl group may have an ethereal oxygen atom, $Rf_5$, $Rf_6$, $Rf_7$ and $Rf_8$ may be linked to each other to form a ring having 4 or more and 8 or less carbon atoms, and the ring may include an ethereal oxygen atom.)

The $Rf_5$, $Rf_6$, $Rf_7$ and $Rf_8$ in the formula (7) are synonymous with $Rf_1$, $Rf_2$, $Rf_3$ and $Rf_4$ in the formula (1), respectively.

In the method for producing a fluororesin of the present invention, by using a radical polymerization initiator represented by the formula (6), it is possible to obtain a fluororesin in which yellowing when performing melt molding of a thick molded product is suppressed. Further, it is possible to obtain a fluororesin having a narrow molecular weight distribution Mw/Mn. By narrowing the molecular weight distribution Mw/Mn, the heat melt moldability is improved. Further, the fluororesin can be obtained with excellent yield and productivity. Further, by using a radical polymerization initiator represented by the formula (6), since the radical polymerization initiator is added to the polymer after decarboxylation, the obtained polymer includes substantially no carbonyl groups and a structure in which the terminal groups represented by the formula (2) are directly added to the polymer, which is advantageous in terms of obtaining a fluororesin in which yellowing when performing melt molding of a thick molded product is suppressed.

In the method for producing a fluororesin of the present invention, it is more preferable to use a radical polymerization initiator represented by the following formula (8). By using the radical polymerization initiator represented by the following formula (8), it is possible to obtain a fluororesin in which yellowing when performing melt molding of a thick molded product is further suppressed. Further, it is possible to obtain a fluororesin having a narrow molecular weight distribution Mw/Mn. By narrowing the molecular weight distribution Mw/Mn, the heat melt moldability is improved. In addition, the fluororesin can be obtained with excellent yield and productivity. In the present description, the radical polymerization initiator represented by the following formula (8) may be referred to as bis(perfluorocyclohexyl carbonyl) peroxide.

[C18]

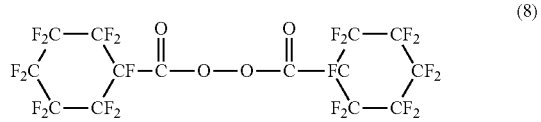

(8)

Bis(perfluorocyclohexyl carbonyl) peroxide can be obtained by the method described in JP-H11-49749-A1 and J. App. Polym. Sci., 1999, 72, 1101-1108. At that time, perfluorohexane (FC-72, manufactured by 3M Japan Ltd.) or the like can be used instead of AK-225 as the solvent. Bis(perfluorocyclohexyl carbonyl) peroxide of the present invention may be synthesized by a method other than the method described in the abovementioned literature. For example, Chem. Rev., 1996, 96, 1779-1808 describes a method for synthesizing fluorinated peroxides, but in addition to a method for reacting an acid fluoride with hydrogen peroxide, a method for reacting an acid chloride with hydrogen peroxide, a method of reacting an acid anhydride with hydrogen peroxide, and the like can be exemplified. At that time, the reaction is advanced by the presence of a base such as sodium hydroxide in the system.

In the method for producing a fluororesin of the present invention, a chain transfer agent may be used for the purpose of adjusting the molecular weight. Examples of the chain transfer agent include organic compounds having 1 to 20 carbon atoms including at least one atom selected from the group consisting of a hydrogen atom and a chlorine atom. Specific examples of the chain transfer agent include organic compounds having 1 to 20 carbon atoms and including a hydrogen atom, such as toluene, acetone, ethyl acetate, tetrahydrofuran, methyl ethyl ketone, methanol, ethanol and isopropanol, and organic compounds having 1 to 20 carbon atoms and including a chlorine atom, such as chloroform, dichloromethane, tetrachloromethane, chloromethane, dichloroethane, trichloroethane, tetrachloroethane, pentachloroethane, hexachloroethane, benzyl chloride, pentafluorobenzyl chloride, and pentafluorobenzoyl chloride. Among them, an organic compound having 1 to 20 carbon atoms including a chlorine atom is preferable, and an organic compound having 1 to 20 carbon atoms including a hydrogen atom and a chlorine atom is more preferable from the viewpoint of suppressing yellowing after heating and melting. The amount of the chain transfer agent may be, for example, 0.01 wt % to 50 wt % based on the total amount of the monomer and the chain transfer agent.

A polymerization method to be used in the method for producing a resin of the present invention is not limited and suitable examples thereof include such methods as solution polymerization, precipitation polymerization, bulk polymerization, emulsion polymerization, and suspension polymerization.

In the production method of the present invention, it is preferable to further mix an organic solvent with the mixture in the step of polymerizing.

In the method for producing a resin of the present invention, as the organic solvent, it is preferable to use an organic solvent in which at least the monomer represented by the formula (7) is dissolved and at least a part of the resin produced by the polymerization is not dissolved, resulting in precipitation of the resin, and the resin produced by the polymerization precipitates as particles in the organic solvent. With such an organic solvent, the flowability of the resin powder is high, continuous supply to a molding machine or the like is possible, the residual solvent on the resin can be suppressed, the bulk density is large, the filling property is increased, and a powder having excellent handleability at the time of molding can be obtained. In the method for producing a resin of the present invention, the organic solvent may be referred to as a "precipitation polymerization solvent". By using the precipitation polymerization solvent, the resin produced by the polymerization reaction can be precipitated as particles having a specific volume average particle diameter, and as a result, resin particles having excellent moldability and filling property can be produced. Further, since a polymerization aid such as an emulsifier or a dispersant is not used, it is possible to produce resin particles containing no emulsifier or dispersant that impairs transparency and heat resistance.

Here, the precipitation polymerization solvent means an organic solvent in which a resin particle including a residue unit represented by the formula (1) remains after being immersed in the solvent for a long time. Specifically, where a resin particle including a residue unit represented by the general formula (1) having a weight average molecular weight Mw of $5 \times 10^4$ to $70 \times 10^4$ is immersed at 50° C. for 5 h or more in an organic solvent taken in an amount (w/w) 10 times that of the resin particle, and the residue of the resin particle can be thereafter visually confirmed in the organic solvent, the organic solvent can be regarded as the precipitation polymerization solvent A. The precipitation polymerization solvent A is preferably an organic solvent such that where a resin is immersed therein at 50° C. for 5 h or more, the solution is thereafter cooled to 25° C., and the resin sample remaining in a solid state is recovered, the weight loss rate of the resin sample is less than 20 wt %. The weight loss rate of the resin sample is more preferably less than 12 wt %, and still more preferably less than 10 wt %.

The loss rate of resin weight can be measured by the following method. After filtering the cooled solution with a filter, a solid matter on the filter is rinsed with the solvent, washed with acetone a plurality of times, and then dried to collect the resin sample on the filter. The weight of the collected resin is measured, and the percentage of the value obtained by subtracting the weight of the collected resin from the amount of resin immersed in the organic solvent and dividing by the amount of resin immersed in the organic solvent is taken as the resin loss rate.

Examples of the precipitation polymerization solvent include non-halogen organic solvents such as acetone, methyl ethyl ketone, hexane and butyl acetate, chlorine-containing organic solvents such as dichloromethane and chloroform, and organic solvents including a fluorine atom in the molecule.

Furthermore, organic solvents containing fluorine atoms and hydrogen atoms in the molecule are preferred as precipitation polymerization solvents because they are less likely to cause chain transfer reactions in radical polymerization, have excellent polymerization yields, and facilitate obtaining high molecular weight polymers. Specific precipitation polymerization solvents containing fluorine atoms and hydrogen atoms in the molecule include 1,1,2,2-tetrafluoroethyl-2,2,2-trifluoroethyl ether, 2,2,2-trifluoroethanol, 1,1,1,3,3,3-hexafluoroisopropanol, 1,2,2,3,3,4,4-heptafluorocyclopentane, 1H,1H-pentafluoropropanol, 1H,1H-heptafluorobutanol, 2-perfluorobutylethanol, 4,4,4-trifluorobutanol, 1H,1H,3H-tetrafluoropropanol, 1H,1H,5H-octafluoropropanol, 1H,1H,7H-dodecafluoroheptanol, 1H,1H,3H-hexafluorobutanol, 2,2,3,3,3-pentafluoropropyldifluoromethyl ether, 2,2,3,3,3-pentafluoropropyl-1,1,2,2-tetrafluoroethyl ether, 1,1,2,2-tetrafluoroethylethyl ether, 1,1,2,2-tetrafluoroethyl-2,2,3,3-tetrafluoropropyl ether, hexafluoroisopropylmethyl ether, 1,1,3,3,3-pentafluoro-2-trifluoromethylpropylmethyl ether, 1,1,2,3,3,3-hexafluoropropylmethyl ether, 1,1,2,3,3,3-hexafluoropropylethyl ether, and 2,2,3,4,4,4-hexafluorobutyldifluoromethyl ether.

Among them, 1,1,2,2-tetrafluoroethyl-2,2,2-trifluoroethyl ether, 2,2,2-trifluoroethanol, 1,1,1,3,3,3-hexafluoroisopropanol and 1,2,2,3,3,4,4-heptafluorocyclopentane are preferable, and 1,2,2,3,3,4 4-heptafluorocyclopentane is preferred because the polymerization yield is excellent and a high molecular weight substance can be easily obtained. The ratio of fluorine atoms to hydrogen atoms in the molecule of the precipitation polymerization solvent is preferably fluorine atom:hydrogen atom=1:9 to 9:1, more preferably 1:9 to 7:3, and even more preferably 4:6 to 7:3 in terms of the number of atoms because the polymerization yield is excellent. It is preferable that the precipitation polymerization solvent include a fluorine atom and a hydrogen atom in the molecule and the amount of the hydrogen atom in the solvent be 1 wt % or more, more preferably 1.5 wt % or more, based on the weight of the solvent molecule, because the polymerization yield is excellent. A range of 1 wt % or more and 5 wt % or less is preferable and a range of 1.5 wt % or more and 4 wt % or less is more preferable because the polymerization yield is excellent and a high molecular weight substance can be easily obtained. Further, a solvent containing no chlorine atom in the molecule is preferable as the precipitation polymerization solvent because the polymerization yield is excellent and a high molecular weight substance can be easily obtained.

As for the ratio of the monomer represented by the formula (7) to the precipitation polymerization solvent, the weight ratio of the monomer:precipitation polymerization solvent=1:99 to 50:50 is preferable, 5:95 to 40:60 is more preferable, and 5:95 to 30:70 is even more preferable because the productivity is excellent and particles having excellent flow characteristics can be obtained.

In the production method of the present invention, the monomer represented by the formula (7) is preferably perfluoro(4-methyl-2-methylene-1,3-dioxolane) represented by a following formula (9), and the residue unit represented by the formula (1) is preferably a perfluoro(4-methyl-2-methylene-1,3-dioxolane) residue unit represented by the formula (4).

[C19]

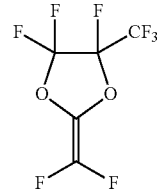

(9)

With the production method of the present invention, it is possible to obtain a fluororesin in which yellowing when performing melt molding of a thick molded product is suppressed. Further, it is possible to obtain a fluororesin having a narrow molecular weight distribution Mw/Mn while exhibiting the abovementioned characteristics. Further, the fluororesin can be obtained with excellent yield and productivity while exhibiting the abovementioned characteristics.

Second Aspect of the Present Invention

The fluororesin, which is one aspect of the present invention, will be described in detail hereinbelow. The fluororesin of the present invention in the following description means the fluororesin of the second aspect of the present invention.

The fluororesin of the present invention includes a residue unit represented by the following formula (1) and, when dissolved in a perfluorohexane solution to obtain a 10 wt % perfluorohexane solution, has a transmittance of 50% or more as measured at an optical path length thereof of 10 mm and a wavelength of 275 nm.

[C20]

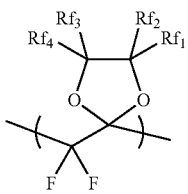
(1)

(In the formula (1), $Rf_1$, $Rf_2$, $Rf_3$ and $Rf_4$ each independently represent one of the groups consisting of a fluorine atom, a linear perfluoroalkyl group having 1 to 7 carbon atoms, a branched perfluoroalkyl group having 3 to 7 carbon atoms, and a cyclic perfluoroalkyl group having 3 to 7 carbon atoms, the perfluoroalkyl group may have an ethereal oxygen atom, $Rf_1$, $Rf_2$, $Rf_3$ and $Rf_4$ may be linked to each other to form a ring having 4 or more and 8 or less carbon atoms, and the ring may include an ethereal oxygen atom.)

Since the fluororesin of the present invention has a bulky ring structure included in the specific formula (1), the fluororesin is amorphous and has high transparency and high heat resistance. In addition, the fluororesin has high electrical properties, chemical resistance, waterproofness, and liquid-repellent oil-repellent properties because the fluororesin is composed only of carbon, fluorine, and oxygen.

In the formula (1), the $Rf_1$, $Rf_2$, $Rf_3$, and $Rf_4$ groups each independently represent one of the groups consisting of a fluorine atom, a linear perfluoroalkyl group having 1 to 7 carbon atoms, a branched perfluoroalkyl group having 3 to 7 carbon atoms, and a cyclic perfluoroalkyl group having 3 to 7 carbon atoms. The perfluoroalkyl group may have an ethereal oxygen atom. Further, $Rf_1$, $Rf_2$, $Rf_3$ and $Rf_4$ may be linked to each other to form a ring having 4 or more and 8 or less carbon atoms, and the ring may include an ethereal oxygen atom.

Examples of the linear perfluoroalkyl group having 1 to 7 carbon atoms include a trifluoromethyl group, a pentafluoroethyl group, a heptafluoropropyl group, a nonafluorobutyl group, an undecafluoropentyl group, a tridecafluorohexyl group, a pentadecafluoroheptyl group, and the like.

Examples of the branched perfluoroalkyl group having 3 to 7 carbon atoms include a heptafluoroisopropyl group, a nonafluoroisobutyl group, a nonafluorosec-butyl group, a nonafluorotert-butyl group, and the like.

Examples of the cyclic perfluoroalkyl group having 3 to 7 carbon atoms include a heptafluorocyclopropyl group, a nonafluorocyclobutyl group, a tridecafluorocyclohexyl group, and the like.

Examples of the linear perfluoroalkyl group that has 1 to 7 carbon atoms and may have an ethereal oxygen atom include a —$CF_2OCF_3$ group, a —$(CF_2)_2OCF_3$ group, a —$(CF_2)_2OCF_2CF_3$ group, and the like.

Examples of the cyclic perfluoroalkyl group that has 3 to 7 carbon atoms and may have an ethereal oxygen atom include a 2-(2,3,3,4,4,5,5,6,6-decafluoro)-pyrinyl group, a 4-(2,3,3,4,4,5,5,6,6-decafluoro)-pyrinyl group, a 2-(2,3,3,4,4,5,5-heptafluoro)-furanyl group, and the like.

A fluororesin in which at least one of $Rf_1$, $Rf_2$, $Rf_3$, and $Rf_4$ is one of the group consisting of a linear perfluoroalkyl group having 1 to 7 carbon atoms, a branched perfluoroalkyl group having 3 to 7 carbon atoms, and a cyclic perfluoroalkyl group having 3 to 7 carbon atoms is preferred. As a result, the fluororesin of the present invention exhibits excellent heat resistance.

Specific examples of the residue unit represented by the formula (1) include the residue unit represented by the following formula (2).

[C21]

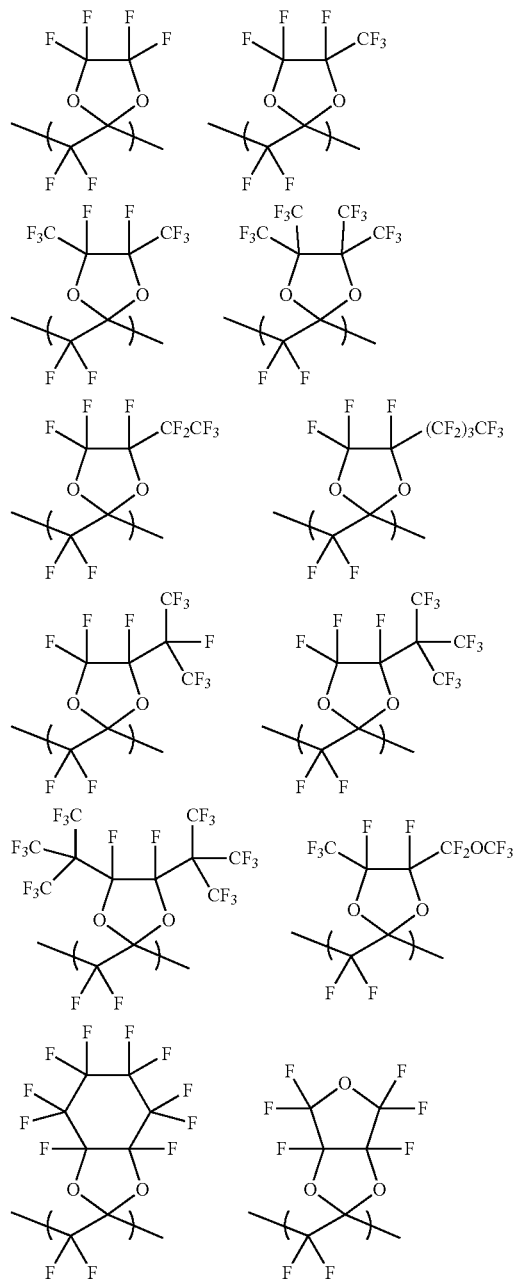
(2)

Among these, a fluororesin including a residue unit represented by the following formula (3) is preferable and a fluororesin including a perfluoro(4-methyl-2-methylene-1,3-dioxolane) residue unit is more preferable because of excellent heat resistance and molding processability thereof.

[C22]

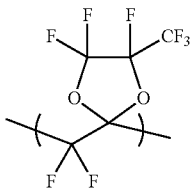

(3)

The fluororesin of the present invention includes a residue unit represented by the formula (1), and when dissolved in a perfluorohexane solution to prepare a perfluorohexane solution having a concentration of 10 wt %, has a transmittance of 50% or more as measured at an optical path length thereof of 10 mm and a wavelength of 275 nm.

The fluororesin of the present invention, when dissolved in a perfluorohexane solution to prepare a perfluorohexane solution having a concentration of 10 wt %, has a transmittance of 50% or more as measured at an optical path length of 10 mm and 275 nm. Here, the transmittance at an optical path length of 10 mm may be a value when the light is actually transmitted through 10 mm in the solution, or a value converted at 10 mm on the assumption that the light is transmitted through 10 mm in the solution. In the latter case, it can be said that the transmittance is when the optical path length is converted to 10 mm. Hereinafter, the 10 wt % fluororesin-perfluorohexane solution of the present invention is also simply referred to as a "measurement solution". By exhibiting a transmittance of 50% or more for the measurement solution, yellowing when performing melt molding of a thick molded product by using the fluororesin of the present invention is suppressed. According to the present inventors, when the light absorption of the measurement solution at the wavelength of 275 nm, which is the ultraviolet range, is large and the transmittance is small, yellowing when performing melt molding of a thick molded product by using the fluororesin of the present invention becomes remarkable. Meanwhile, it was found that when the light absorption of the measurement solution at the wavelength of 275 nm is small and the transmittance is large, yellowing when performing melt molding of a thick molded product by using the fluororesin of the present invention is suppressed.

The transmittance of the measurement solution at the wavelength of 275 nm is preferably 70% or more, more preferably 80% or more, further preferably 85% or more, even more preferably 90% or more, and still more preferably 95% or more. As a result, yellowing after heating and melting is further suppressed.

Further, it is preferable that the measurement solution does not have a peak showing a minimum in the transmission spectrum at an optical path length of 10 mm and a wavelength of 250 nm to 300 nm.

The fluororesin of the present invention preferably does not have a peak at −150 ppm to 170 ppm in solid-state $^{19}$F-NMR because yellowing when performing melt molding of a thick molded product is suppressed.

The fluororesin of the present invention preferably has a weight average molecular weight Mw in the range of $5\times10^4$ to $3\times10^5$. When the weight average molecular weight Mw is in this range, the melt molding processability and the defoaming property at the time of melting are excellent. Further, when the weight average molecular weight Mw is in this range, fewer cracks occur at the time of heating and cooling. From the viewpoint of excellent melt molding processability and excellent defoaming property at the time of melting, it is more preferable that the weight average molecular weight Mw of the fluororesin of the present invention be in the range of $5\times10^4$ to $2\times10^5$.

The weight average molecular weight Mw of the fluororesin of the present invention can be calculated from the elution time of a sample and a standard sample and the molecular weight of the standard sample by using gel permeation chromatography (GPC). For example, standard polymethyl methacrylate having a known molecular weight is used as the standard sample, and a solvent capable of dissolving both the standard sample and the fluororesin is used as the eluent. The solution can be exemplified by a solution prepared by adding 1,1,1,3,3,3-hexafluoro-2-propanol (manufactured by Wako Pure Chemical Industries, Ltd.) to Asahiklin AK-225 (manufactured by Asahi Glass Co., Ltd.) at 10 wt % with respect to AK-225.

The molecular weight distribution Mw/Mn, which is the ratio of the weight average molecular weight Mw to the number average molecular weight Mn of the fluororesin of the present invention, is not particularly limited, but from the viewpoint of suppressing yellowing after heating and melting, excellent melt molding processability, excellent defoaming property at the time of melting, and fewer cracks occurring at the time of heating and cooling, the molecular weight distribution Mw/Mn is preferably 1.2 to 8, more preferably 1.2 to 5, and even more preferably 1.5 to 3. The number average molecular weight Mn can be measured by the same method as the abovementioned method for measuring the weight average molecular weight Mw, and the molecular weight distribution Mw/Mn can be calculated by dividing the weight average molecular weight Mw by the number average molecular weight Mn.

The yellowness index (YI) of the fluororesin of the present invention that is measured in the diameter direction on a thick melt-molded product (a columnar molded body having a diameter of 10 mm and a height of about 17 mm that is molded by heating and melting at 280° C. for 24 h in a test tube) is preferably 10 or less, more preferably 4 or less, and still more preferably 3 or less. According to the present inventors, where melt molding of a thick molded product is performed in a closed state, yellowing after heating and melt molding of the fluororesin becomes remarkable as compared with heating in an open environment. A method for evaluating the yellowness and coloring of a thick melt-molded product may be exemplified by a method for evaluating the yellowness index (YI) measured in the diameter direction of a columnar body (diameter 10 mm and height about 17 mm) obtained by melting and molding 3 g of the fluororesin of the present invention by heating at 280° C. for 24 h in a test tube having an outer diameter of 13 mm. Here, the diameter direction is the vertical direction when the test tube is laid down sideways on a desk or the like. The yellowness index can be measured by laying down the test tube, which still includes the obtained resin molded product, sideways on white paper, taking a digital photograph from above, reading RGB values of the molded product with software from the obtained image, obtaining tristimulus values X, Y, and Z of an XYZ color system by substituting the read-out RGB values into the following equations, and calculating the yellowness index (YI) in a C light source (auxiliary illuminant C) from X, Y, and Z according to the method of JIS K 7373.

$X=0.4124R+0.3576G+0.1805B,$ $Y=0.2126R+0.7152G+0.0722B,$ $Z=0.0193R+0.1192G+0.9505B.$

The fluororesin of the present invention preferably has a yellowness index (YI) of a flaky melt-molded product (thickness 3 mm, molded by heating and melting at 280° C. for 24 h in a petri dish) of 1 or less. Examples of the molding method and the evaluation method are described in Examples.

The fluororesin of the present invention may include other monomer residue units, and examples of the other monomer residue units include tetrafluoroethylene (TFE), hexafluoropropylene (HFP), chlorotrifluoroethylene (CTFE), trifluoroethylene, hexafluoroisobutylene, perfluoroalkylethylene, fluorovinyl ether, vinyl fluoride (VF), vinylidene fluoride (VDF), perfluoro-2,2-dimethyl-1,3-dioxol (PDD), perfluoro (allyl vinyl ether), perfluoro (butenyl vinyl ether), and the like.

The particle diameter of the fluororesin of the present invention is not particularly limited, but the volume average particle diameter is preferably 1 μm to 1000 μm, more preferably 1 μm to 500 μm, and even more preferably 1 μm to 300 μm because the flowability of the resin powder is high, continuous supply to a molding machine or the like is possible, the residual solvent on the resin can be suppressed, the bulk density is large, the filling property is improved and the handleability at the time of molding is excellent.

The volume average particle diameter of the fluororesin of the present invention can be evaluated by measuring the particle diameter distribution (volume distribution) by a laser diffraction/scattering method. The particle diameter distribution by the laser diffraction/scattering method can be measured by dispersing and measuring resin particles in water or an organic solvent such as methanol. As a laser scatterometer, a microtrack manufactured by Microtrack Bell Co., Ltd. can be exemplified.

The volume average particle diameter is an average particle diameter expressed on a volume basis and is also called a Mean Volume Diameter. Where the particle diameter distribution is divided into particle diameter channels, the representative particle diameter value of each particle diameter channel is denoted by d and the volume-based percentage for each particle diameter channel is denoted by v, the volume average particle diameter is expressed as Σ(vd)/Σ(v).

The fluororesin of the present invention is preferably in the form of powder and has a volume average particle diameter of 1 μm to 1000 μm.

The method for producing a fluororesin, which is one aspect of the present invention, will be described in detail hereinbelow.

The fluororesin of the present invention can be produced by polymerizing a mixture including a radical polymerization initiator represented by the following formula (4) and a monomer represented by the following formula (5).

[C23]

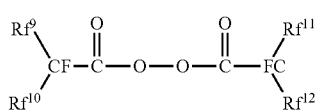

(4)

(In the formula (4), $Rf^9$, $Rf^{10}$, $Rf^{11}$, and $Rf^{12}$ each independently represent a perfluoroalkyl group having 1 to 20 carbon atoms, the perfluoroalkyl group may have an ethereal oxygen atom, $Rf^9$ and $Rf^{10}$ may be linked to each other to form a ring having 4 or more and 8 or less carbon atoms, $Rf^{11}$ and $Rf^{12}$ may be linked to each other to form a ring having 4 or more and 8 or less carbon atoms, and the ring may include an ethereal oxygen atom.)

[C24]

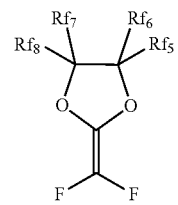

(5)

(In the formula (5), $Rf_5$, $Rf_6$, $Rf_7$ and $Rf_8$ each independently represent one of the groups consisting of a fluorine atom, a linear perfluoroalkyl group having 1 to 7 carbon atoms, a branched perfluoroalkyl group having 3 to 7 carbon atoms, and a cyclic perfluoroalkyl group having 3 to 7 carbon atoms, the perfluoroalkyl group may have an ethereal oxygen atom, $Rf_5$, $Rf_6$, $Rf_7$ and $Rf_8$ may be linked to each other to form a ring having 4 or more and 8 or less carbon atoms, and the ring may include an ethereal oxygen atom.)

The $Rf_5$, $Rf_6$, $Rf_7$ and $Rf_8$ in the formula (5) are synonymous with $Rf_1$, $Rf_2$, $Rf_3$ and $Rf_4$ in the formula (1), respectively.

In the method for producing a fluororesin of the present invention, by using a radical polymerization initiator represented by the formula (4), it is possible to obtain a fluororesin in which yellowing when performing melt molding of a thick molded product is suppressed. Furthermore, by using a radical polymerization initiator represented by the formula (4), the fluororesin can be obtained at excellent yield and productivity as compared with the case of using a linear perfluorodiacyl peroxide. Further, it is possible to obtain a fluororesin having a narrow molecular weight distribution Mw/Mn. By narrowing the molecular weight distribution Mw/Mn, the heat melt moldability is improved. Further, it is considered that by using a radical polymerization initiator represented by the formula (4), since the radical polymerization initiator is added to the polymer after decarboxylation, the obtained polymer includes substantially no carbonyl groups and a structure in which the terminal groups represented by the formula (6) are directly added to the polymer, which is advantageous in terms of obtaining a fluororesin in which yellowing when performing melt molding of a thick molded product is suppressed.

[C25]

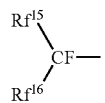

(6)

(In the formula (6), $Rf^{15}$ and $Rf^{16}$ each independently represent a perfluoroalkyl group having 1 to 20 carbon atoms, the perfluoroalkyl group may have an ethereal oxygen atom, $Rf^{15}$ and $Rf^{16}$ may be linked to each other to form a ring having 4 or more and 8 or less carbon atoms, and the ring may include an ethereal oxygen atom.)

In the formula (4), $Rf^9$, $Rf^{10}$, $Rf^{11}$, and $Rf^{12}$ each independently represent a perfluoroalkyl group having 1 to 20 carbon atoms, the perfluoroalkyl group may have an ethereal oxygen atom, $Rf^9$ and $Rf^{10}$ may be linked to each other to form a ring having 4 or more and 8 or less carbon atoms, $Rf^{11}$ and $Rf^{12}$ may be linked to each other to form a ring having 4 or more and 8 or less carbon atoms, and the ring may include an ethereal oxygen atom.

Examples of the perfluoroalkyl group having 1 to 20 carbon atoms in the formula (4) include a linear perfluoroalkyl group having 1 to 20 carbon atoms such as a trifluoromethyl group, a pentafluoroethyl group, a heptafluoropropyl group, a nonafluorobutyl group, an undecafluoropentyl group, a tridecafluorohexyl group, a pentadecafluoroheptyl group, and a perfluorohexadecyl group; a branched perfluoroalkyl group having 3 to 7 carbon atoms such as a heptafluoroisopropyl group, a nonafluoroisobutyl group, a nonafluorosec-butyl group, and a nonafluorotert-butyl group; a cyclic perfluoroalkyl group such as a nonafluorocyclobutyl group and a tridecafluorocyclohexyl group; and a perfluoroalkyl group having an ethereal oxygen atom such as a —$OCF_3$ group, a —$OCF_2CF_3$ group, and a —$OC_3F_7$ group. Examples of a ring in which a ring having 4 to 20 carbon atoms is formed by linking with each other include a perfluorocyclobutyl group, a perfluorocyclopentyl group, a perfluorocyclohexyl group, a perfluoropentyl group, a perfluorooctyl group, a perfluorooxolan group, and a perfluorodioxolan group.

Examples of the radical polymerization initiator represented by the formula (4) include radical polymerization initiators represented by the following formula (7).

[C26]

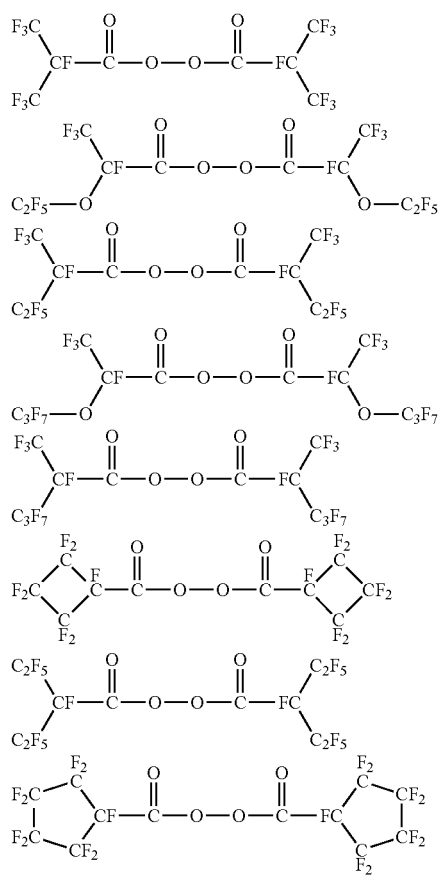

(7)

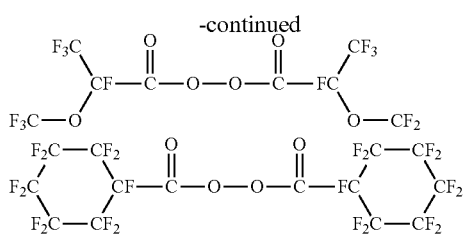

In the method for producing a fluororesin of the present invention, it is more preferable to use a radical polymerization initiator represented by the following formula (8). By using the radical polymerization initiator represented by the following formula (8), it is possible to obtain a fluororesin in which yellowing when performing melt molding of a thick molded product is further suppressed. Further, it is possible to obtain a fluororesin having a narrow molecular weight distribution Mw/Mn. By narrowing the molecular weight distribution Mw/Mn, the heat melt moldability is improved. In addition, the fluororesin can be obtained with excellent yield and productivity.

[C27]

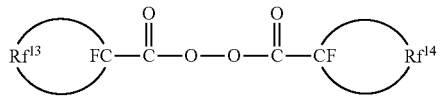

(8)

(In the formula (8), $Rf^{13}$ and $Rf^{14}$ each independently represent a perfluoroalkyl having 3 to 20 carbon atoms, and the perfluoroalkyl group may have an ethereal oxygen atom.)

Examples of the perfluoroalkyl group having 3 to 20 carbon atoms in the formula (8) include a —$CF_2CF_2CF_2$— group, a —$CF_2CF_2CF_2CF_2$— group, a —$CF_2CF_2CF_2CF_2CF_2$— group, a —$CF_2CF_2CF_2CF_2CF_2CF_2$— group, a —$CF_2CF_2CF_2CF_2CF_2CF_2CF_2$— group, a —$CF_2CF_2CF(CF_3)CF_2CF_2$— group, a —$CF_2CF_2OCF_2CF_2$— group, a —$OCF_2CF_2CF_2O$— group, and the like.

In the method for producing a fluororesin of the present invention, it is more preferable to use a radical polymerization initiator represented by the following formula (9) and further by the following formula (10). By using the radical polymerization initiator represented by the formula (9) and further by the formula (10), it is possible to obtain a fluororesin in which yellowing when performing melt molding is further suppressed, and also in which yellowing when performing melt molding of a thick molded product in a closed state such as inside a test tube is further suppressed. Further, it is possible to obtain a fluororesin having a narrow molecular weight distribution Mw/Mn. By narrowing the molecular weight distribution Mw/Mn, the heat melt moldability is improved. In addition, the fluororesin can be obtained with excellent yield and productivity. In the present description, the radical polymerization initiator represented by the formula (10) may be referred to as bis(perfluorocyclohexyl carbonyl) peroxide.

[C28]

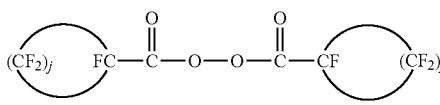
(9)

(In the formula (9), j is an integer of 3 to 20.)

[C29]

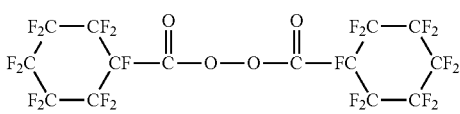
(10)

Bis(perfluorocyclohexyl carbonyl) peroxide can be obtained by the method described in JP-H11-49749-A and J. App. Polym. Sci., 1999, 72, 1101-1108. At that time, perfluorohexane (FC-72, manufactured by 3M Japan Ltd.) or the like can be used instead of AK-225 as the solvent. Bis(perfluorocyclohexyl carbonyl) peroxide of the present invention may be synthesized by a method other than the method described in the abovementioned literature. For example, Chem. Rev., 1996, 96, 1779-1808 describes a method for synthesizing fluorinated peroxides, but in addition to a method for reacting an acid fluoride with hydrogen peroxide, a method for reacting an acid chloride with hydrogen peroxide, a method of reacting an acid anhydride with hydrogen peroxide, and the like can be exemplified. At that time, the reaction is advanced by the presence of a base such as sodium hydroxide in the system.

In the method for producing a fluororesin of the present invention, a chain transfer agent may be used for the purpose of adjusting the molecular weight. Examples of the chain transfer agent include organic compounds having 1 to 20 carbon atoms including at least one atom selected from the group consisting of a hydrogen atom and a chlorine atom. Specific examples of the chain transfer agent include organic compounds having 1 to 20 carbon atoms including a hydrogen atom, such as toluene, acetone, ethyl acetate, tetrahydrofuran, methyl ethyl ketone, methanol, ethanol and isopropanol, and organic compounds having 1 to 20 carbon atoms including a chlorine atom, such as chloroform, dichloromethane, tetrachloromethane, chloromethane, dichloroethane, trichloroethane, tetrachloroethane, pentachloroethane, hexachloroethane, benzyl chloride, pentafluorobenzyl chloride, and pentafluorobenzoyl chloride. Among them, an organic compound having 1 to 20 carbon atoms including a chlorine atom is preferable, and an organic compound having 1 to 20 carbon atoms including a hydrogen atom and a chlorine atom is more preferable from the viewpoint of suppressing yellowing after heating and melting. The amount of the chain transfer agent may be, for example, 0.01 wt % to 50 wt % based on the total amount of the monomer and the chain transfer agent.

A polymerization method to be used in the method for producing a resin of the present invention is not limited and suitable examples thereof include solution polymerization, precipitation polymerization, bulk polymerization, emulsion polymerization, and suspension polymerization.

In the production method of the present invention, it is preferable to further mix an organic solvent with the mixture in the step of polymerizing. In the method for producing a resin of the present invention, as the organic solvent, it is preferable to use an organic solvent in which at least the monomer represented by the formula (5) is dissolved and at least a part of the resin including a residue unit produced by the polymerization and represented by the formula (1) is not dissolved, resulting in precipitation of the resin, and the resin produced by the polymerization precipitates as particles in the organic solvent. With such an organic solvent, the flowability of the resin powder is high, continuous supply to a molding machine or the like is possible, the residual solvent on the resin can be suppressed, the bulk density is large, the filling property is increased, and a powder having excellent handleability at the time of molding can be obtained. In the method for producing a resin of the present invention, the organic solvent may be referred to as a "precipitation polymerization solvent". By using the precipitation polymerization solvent, the resin produced by the polymerization reaction can be precipitated as particles having a specific volume average particle diameter, and as a result, resin particles having excellent moldability and filling property can be produced. Further, since a polymerization aid such as an emulsifier or a dispersant is not used, it is possible to produce resin particles containing no emulsifier or dispersant that impairs transparency and heat resistance.

Here, the precipitation polymerization solvent means an organic solvent in which a resin particle including a residue unit represented by the formula (1) remains after being immersed in the solvent for a long time. Specifically, where a resin particle including a residue unit represented by the general formula (1) having a weight average molecular weight Mw of $5 \times 10^4$ to $70 \times 10^4$ is immersed at 50° C. for 5 h or more in an organic solvent taken in an amount (w/w) 10 times that of the resin particle, and the residue of the resin particle can be thereafter visually confirmed in the organic solvent, the organic solvent can be regarded as the precipitation polymerization solvent A. The precipitation polymerization solvent A is preferably an organic solvent such that where a resin is immersed therein at 50° C. for 5 h or more, the solution is thereafter cooled to 25° C., and the resin sample remaining in a solid state is recovered, the weight loss rate of the resin sample is less than 20 wt %. The weight loss rate of the resin sample is more preferably less than 12 wt %, and still more preferably less than 10 wt %.

The loss rate of resin weight can be measured by the following method. After filtering the cooled solution with a filter, a solid matter on the filter is rinsed with the solvent, washed with acetone a plurality of times, and then dried to collect the resin sample on the filter. The weight of the collected resin is measured, and the percentage of the value obtained by subtracting the weight of the collected resin from the amount of resin immersed in the organic solvent and dividing by the amount of resin immersed in the organic solvent is taken as the resin loss rate.

Examples of the precipitation polymerization solvent include non-halogen organic solvents such as acetone, methyl ethyl ketone, hexane and butyl acetate, chlorine-containing organic solvents such as dichloromethane and chloroform, and organic solvents including a fluorine atom in the molecule.

Further, as the precipitation polymerization solvent, an organic solvent including a fluorine atom and a hydrogen atom in the molecule is preferable because a chain transfer reaction is unlikely to occur in radical polymerization, the polymerization yield is excellent, and a high molecular weight substance can be easily obtained. Specific examples of the precipitation polymerization solvent including a fluorine atom and a hydrogen atom in the molecule include 1,1,2,2-tetrafluoroethyl-2,2,2-trifluoroethyl ether, 2,2,2-trifluoroethanol, 1,1,1,3,3,3-hexafluoroisopropanol, 1,2,2,3,3,4,4-heptafluorocyclopentane, 1H,1H-pentafluoropropanol, 1H,1H-heptafluorobutanol, 2-perfluorobutylethanol, 4,4,4-trifluorobutanol, 1H,1H,3H-tetrafluoropropanol, 1H,1H,5H-octafluoropropanol, 1H,1H,7H-dodecafluoroheptanol, 1H,1H,3H-hexafluorobutanol, 2,2,3,3,3-pentafluoropropyldifluoromethyl ether, 2,2,3,3,3-pentafluoropropyl-1,1,2,2-tetrafluoroethyl ether, 1,1,2,2-tetrafluoroethylethyl ether, 1,1,2,2-tetrafluoroethyl-2,2,3,3-tetrafluoropropyl ether, hexafluoroisopropylmethyl ether, 1,1,3,3,3-pentafluoro-2-trifluoromethylpropylmethyl ether, 1,1,2,3,3,3-hexafluoropropylmethyl ether, 1,1,2,3,3,3-hexafluoropropylethyl ether, 2,2,3,4,4,4-hexafluorobutyldifluoromethyl ether, and the like.

Among them, 1,1,2,2-tetrafluoroethyl-2,2,2-trifluoroethyl ether, 2,2,2-trifluoroethanol, 1,1,1,3,3,3-hexafluoroisopropanol and 1,2,2,3,3,4,4-heptafluorocyclopentane are preferable, and 1,2,2,3,3,4 4-heptafluorocyclopentane is preferred because the polymerization yield is excellent and a high molecular weight substance can be easily obtained. The ratio of fluorine atoms to hydrogen atoms in the molecule of the precipitation polymerization solvent is preferably fluorine atom:hydrogen atom=1:9 to 9:1, more preferably 1:9 to 7:3, and even more preferably 4:6 to 7:3 in terms of the number of atoms because the polymerization yield is excellent. It is preferable that the precipitation polymerization solvent include a fluorine atom and a hydrogen atom in the molecule and the amount of the hydrogen atom in the solvent be 1 wt % or more, more preferably 1.5 wt % or more, based on the weight of the solvent molecule because the polymerization yield is excellent. A range of 1 wt % or more and 5 wt % or less is preferable and a range of 1.5 wt % or more and 4 wt % or less is more preferable because the polymerization yield is excellent and a high molecular weight substance can be easily obtained. Further, a solvent containing no chlorine atom in the molecule is preferable as the precipitation polymerization solvent because the polymerization yield is excellent and a high molecular weight substance can be easily obtained.

As for the ratio of the monomer represented by the formula (5) to the precipitation polymerization solvent, the weight ratio of the monomer:precipitation polymerization solvent=1:99 to 50:50 is preferable, 5:95 to 40:60 is more preferable, and 5:95 to 30:70 is even more preferable because the productivity is excellent and particles having excellent flow characteristics can be obtained.

In the production method of the present invention, the monomer represented by the formula (5) is preferably perfluoro(4-methyl-2-methylene-1,3-dioxolane) represented by a following formula (11), and the residue unit represented by the formula (1) is preferably a perfluoro(4-methyl-2-methylene-1,3-dioxolane) residue unit represented by the formula (3).

[C30]

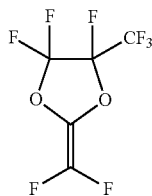

(11)

By producing by the method of the present invention, it is possible to obtain a fluororesin in which yellowing when performing melt molding of a thick molded product can be suppressed. Further, it is possible to obtain a fluororesin having a narrow molecular weight distribution Mw/Mn while exhibiting the above characteristics. Further, the fluororesin can be obtained with excellent yield and productivity while exhibiting the abovementioned characteristics.

EXAMPLES

Hereinafter, the first aspect and the second aspect of the present invention will be described more specifically with reference to Examples and Comparative Examples, but the present invention is not limited thereto.

[Measurement of Weight Average Molecular Weight Mw and Molecular Weight Distribution Mw/Mn]

Measurements were performed using a gel permission chromatograph equipped with an RI detector and a column TSKgel SuperHZM-M manufactured by Tosoh Corporation. An eluent was prepared by adding 1,1,1,3,3,3-hexafluoro-2-propanol (manufactured by Wako Pure Chemical Industries, Ltd.) to ASAHIKLIN AK-225 (manufactured by Asahi Glass Co., Ltd.) in an amount of 10% by weight based on AK-225. Standard polymethyl methacrylate manufactured by Agilent was used as a standard sample, and the weight average molecular weight Mw in terms of polymethyl methacrylate and the molecular weight distribution Mw/Mn was calculated from the elution times of the sample and the standard sample.

[Solid-State $^{19}$F-NMR Measurement]

Solid-state $^{19}$F-NMR measurement was implemented by using VNMRS-400 manufactured by Varian, using a 1.6 mm FASTMAS probe at a magnetic field strength of 376.18 MHz (19F), setting a pulse width of 1.3 ρs, a spectrum width of 250 kHz (664.6 ppm), a spectrum center of −120 ppm, a waiting time of 10 sec, a MAS rotation speed of 39 kHz, and an integration number of 2048 times in a Hahn-echo method, taking PTFE (−122.0 ppm) as a reference, and using about 10 mg of the fluororesin.

[Solid-State $^{13}$C-NMR Measurement]

Solid-state $^{13}$C-NMR measurement was implemented by using VNMRS-400 manufactured by Varian, using a 4.0 mm MAS probe at a magnetic field strength of 100.55 MHz (13C), setting a spectrum width of 30.5 kz, a spectrum center of 77.5 ppm, a waiting time of 3 sec, a MAS rotation speed of 10 kHz, and an integration number of 4096 times in a CP/MAS method, taking TMS (0 ppm) as a reference, and using about 50 mg of the fluororesin.

[Measurement of Yellowness Index (YI) of Thick Melt-Molded Product (φ10 mm×H17 mm, in Test Tube, 280° C., 24 h)]

A total of 3.0 g of the fluororesin was put in a glass test tube (made by Nichiden-Rika Glass Co., Ltd., ST-13M) with an outer diameter of φ13 mm and a total length of 100 mm, the mouth of the test tube was covered with an aluminum foil and an aluminum cap (Maruemu Corporation, M-1), the test tube held vertically on a stand was placed in an oven, heated at 280° C. for 24 h and then allowed to cool to obtain a columnar resin molded product (diameter: 10 mm, height: about 17 mm) in the test tube. With the obtained resin molded product still in the test tube, the test tube was placed sideways on white paper, a digital photograph was taken from above under a white fluorescent lamp by using Power Shot SX620HS (manufactured by Canon Inc.), and the RGB values of the molded product were read from the obtained image by using Paint (image processing software manufactured by Microsoft Corporation). The read-out RGB values were used to obtain the tristimulus values X, Y, and Z of the XYZ color system by the following formulas. From X, Y, and Z, the yellowness index (YI) in the C light source (auxiliary illuminant C) was calculated according to the method of JIS K 7373, and the yellowness index (YI) of the thick melt-molded product (($\varphi$10 mm×H17 mm, in test tube, 280° C., 24 h) was obtained.

$$X=0.4124R+0.3576G+0.1805B,$$

$$Y=0.2126R+0.7152G+0.0722B,$$

$$Z=0.0193R+0.1192G+0.9505B.$$

[Yellowness Index (YI) of Flaky Melt-Molded Product (3 mm Thick, 280° C. 24 h in petri dish)] A total of 2.0 g of fluororesin was weighed into a Petri dish with an inner diameter of 26.4 mm (only a receiver in a set including a lid and a receiver in a flat Petri dish manufactured by Flat Co., Ltd., a glass thickness of 1 mm at the bottom), the Petri dish was placed in an inert oven (DN4111, manufactured by Yamato Scientific Co., Ltd.) and allowed to stand at room temperature for 30 min under an air stream (20 L/min), and the temperature was then raised to 280° C. over 30 min, followed by heating at 280° C. for 24 h. After that, the power of the inert oven was turned off while the oven door was closed and the air flow was maintained (20 L/min), and the sample was naturally cooled for 12 h and taken out. As a result, a fluororesin heat-melted molded product having a thickness of 3 mm and a diameter of 26.4 mm was obtained on the Petri dish. At this time, air compressed by a compressor and passed through a dehumidifier (dew point temperature −20° C. or lower) was used as the air. The transmittance was measured at each wavelength at 1 nm intervals at wavelengths of 200 nm to 1500 nm using a spectrophotometer (U-4100, manufactured by Hitachi High-Tech Science Co., Ltd.) for each obtained fluororesin heat-melted molded product together with the Petri dish. Data at 5 nm intervals at wavelengths of 380 nm to 780 nm were extracted from the measured transmittance data, and the tristimulus values X, Y, and Z of the XYZ color system were calculated according to the method of JIS Z 8701, the yellow index (YI) under a C light source (auxiliary illuminant C) was calculated according to the method of JIS K 7373, and the yellow index (YI) of the fluororesin heat-melted molded product including the Petri dish was obtained. The yellow index (YI) of the Petri dish (receiver only) alone was measured, and the yellow index (YI) of the Petri dish (receiver only) was subtracted from the yellow index (YI) of the fluororesin molded product including the Petri dish to obtain the yellow index (YI) of the fluororesin heat-melted molded product having a thickness of 3 mm. The yellow index (YI) of the Petri dish alone (receiver only) was 0.21.

[Measurement of Volume Average Particle Diameter]

The volume average particle diameter (unit: μm) was measured using Microtrac MT3000 manufactured by Microtrac Bell Co., Ltd. and methanol as a dispersion medium.

[Measurement of Transmittance of Polymer Solution]

The fluororesin was dissolved in perfluorohexane (FC-72, manufactured by 3M Japan Ltd.) to prepare a fluororesin-perfluorohexane solution with a concentration of 10 wt %. An ultraviolet-visible spectrophotometer UH5300 (manufactured by Hitachi, Ltd.) and quartz cells with an optical path length of 10 mm were used, the quartz cell containing the obtained polymer solution was set on the sample side of the spectrophotometer and the quartz cell containing perfluorohexane (FC-72) was set on the reference side, and the transmittance of the polymer solution was measured at a wavelength range of 190 nm to 700 nm, a scan speed of 400 nm/min, and an interval of 1 nm. The value of the transmittance at the wavelength of 275 nm obtained here was taken as the value of the transmittance of the fluororesin in a 10 wt % perfluorohexane solution having an optical path length of 10 mm at a wavelength of 275 nm. Further, from the graph of the relationship between the wavelength and the transmittance, it was determined whether the peak showing the minimum was present at the wavelength of 250 nm to 300 nm.

The following Examples 1-1 to 1-3, Comparative Examples 1-1 to 1-7, and Reference Example 1-1 are Examples, Comparative Examples, and Reference Example relating to the first aspect of the present invention.

Example 1-1

The inside of a 3 L SUS316 autoclave equipped with a paddle type stirring blade, a nitrogen introduction tube and a thermometer was replaced with nitrogen. A solution in which 2.33 g (0.0036 mol) of bis(perfluorocyclohexyl carbonyl) peroxide as an initiator was dissolved in 230 g of FC-72 (perfluorohexane, manufactured by 3M Japan Ltd.), 175 g (0.72 mol) of perfluoro(4-methyl-2-methylene-1,3-dioxolane) as a monomer, and 470 g of FC-72 as a polymerization solvent were put into the autoclave after removing dissolved oxygen, and solution polymerization was carried out by holding for 24 h at 55° C. under stirring to obtain a viscous liquid in which the resin was dissolved. After cooling to room temperature, an ampoule was opened, and the resin solution obtained for adjusting the viscosity was added to 875 g of FC-72 and diluted to prepare a resin diluted solution. A total of 5250 g of ZEORORA H (manufactured by Zeon Corporation, 1,2,2,3,3,4,4-heptafluorocyclopentane, content of hydrogen atoms in the solvent molecule: 1.55 wt %, (fluorine atom):(hydrogen atom)=7:3 (number ratio) in the solvent molecule) was put in a plastic cup equipped with a stirring blade, and the resin diluted solution was added to the plastic cup under stirring to precipitate the resin. The precipitated resin was collected by filtration, washed with acetone twice, and vacuum dried to obtain a powdered perfluoro(4-methyl-2-methylene-1,3-dioxolane) resin (yield 93%).

The weight average molecular weight of the obtained fluororesin was $9.5 \times 10^4$, and the molecular weight distribution Mw/Mn was 3.74. Table 1 shows the evaluation results of the fluororesin.

As a result of solid-state $^{19}$F-NMR measurement on the obtained fluororesin, peaks derived from the terminal perfluorocyclohexyl group were confirmed at −140.7 ppm and −143.9 ppm. The integrated value of the peak (6F) derived from the terminal group was 1.46 in total with respect to the integrated value of 500 of the main chain peak (5F) at −81.3 ppm.

Further, the filtrate obtained by precipitating the resin with ZEORORA H during the above operation was dried, and the solid matter was washed with acetone and vacuum dried to obtain an oligomer.

As a result of solid-state $^{13}$C-NMR measurement of the obtained oligomer, a peak derived from the F atom at the 1 position of the perfluorocyclohexyl group directly bonded to the end of the polymer was confirmed at 91 ppm. Meanwhile, no peak was observed in the carbonyl group region at 130 ppm to 150 ppm.

Example 1-2

The inside of a 3 L SUS316 autoclave equipped with a paddle type stirring blade, a nitrogen introduction tube and a thermometer was replaced with nitrogen.

A solution in which 0.80 g (0.0012 mol) of bis(perfluorocyclohexyl carbonyl) peroxide as an initiator was dissolved in 80 g of FC-72, 300 g (1.23 mol) of perfluoro(4-methyl-2-methylene-1,3-dioxolane) as a monomer, 1120 g of ZEORORA-H as a polymerization solvent, and 33.33 g of chloroform (manufactured by Wako Pure Chemical Industries, Ltd.) as a chain transfer agent (0.279 mol, (amount of chain transfer agent):(total of monomer and chain transfer agent)=10 wt %) were placed in an autoclave after removing the dissolved oxygen, and precipitation polymerization was carried out by holding for 24 h at 40° C. under stirring to obtain a white turbid slurry in which the resin precipitated in the polymerization solvent. The slurry was cooled to room temperature, and the generated resin particles were collected by filtration, washed with acetone, and vacuum dried to obtain a powdered perfluoro(4-methyl-2-methylene-1,3-dioxolane) resin (yield: 90%).

The weight average molecular weight of the obtained fluororesin was $8.8 \times 10^4$, and the molecular weight distribution Mw/Mn was 2.48. Further, the volume average particle diameter of the obtained fluororesin was 26 μm, the powder excelled in flowability, and the flowability of the powder was superior to that in Example 1-1.

Example 1-3

As a result of solid-state $^{19}$F-NMR measurement of the fluororesin obtained in Example 1-2, peaks derived from the terminal perfluorocyclohexyl group were confirmed at −140.2 ppm and −144.4 ppm. The integrated value of the peak (6F) derived from the terminal group was 0.23 in total with respect to the integrated value of 500 of the main chain peak (5F) at −81.3 ppm.

Comparative Example 1-1

A total of 0.173 g (0.000410 mol) of bis(2,3,4,5,6-pentafluorobenzoyl) peroxide as an initiator, 10.0 g (0.0410 mol) of perfluoro(4-methyl-2-methylene-1,3-dioxolane) as a monomer, and 40.0 g of FC-72 as a polymerization solvent were put in a glass ampoule having a capacity of 75 mL, and after repeated nitrogen replacement and depressurization by freeze degassing, the ampoule was fusion-sealed under reduced pressure (monomer/solvent=20/80 (wt/wt)). The ampoule was placed in a thermostat at 55° C. and held for 24 h to carry out radical solution polymerization to obtain a viscous liquid in which the resin was dissolved. After cooling to room temperature, the ampoule was opened, and the obtained resin solution was added to 50 g of FC-72 for viscosity adjustment and diluted to prepare a resin diluted solution. A total of 240 g of ZEORORA H was placed in a beaker equipped with a stirrer, and the resin diluted solution was added to the beaker under stirring to precipitate the resin. The precipitated resin was collected by filtration, washed with acetone twice, and vacuum dried to obtain a lump-like perfluoro(4-methyl-2-methylene-1,3-dioxolane) resin (yield 94%).

The weight average molecular weight of the obtained fluororesin was $21 \times 10^4$, and the molecular weight distribution Mw/Mn was 2.8. Further, the obtained fluororesin was in the form of a lump and was inferior in the flowability of the powder. Table 1 shows the evaluation results of the fluororesin.

When the solid-state $^{19}$F-NMR measurement of the fluororesin was carried out, peaks showing maximums at −140 ppm to −142 ppm and −143 ppm to −145 ppm were not detected. The filtrate obtained by precipitating the resin in ZEORORA H was dried by the above operation, the solid matter was washed with acetone and vacuum dried, and then the obtained oligomer was measured by solid-state $^{13}$C-NMR. As a result, no peak was confirmed in the region of 80 ppm to 100 ppm. In addition, carbonyl group peaks were detected at 139 ppm and 143 ppm.

Comparative Example 1-2

A solution in which 0.0865 g (0.000205 mol) of bis(2,3,4,5,6-pentafluorobenzoyl) peroxide as an initiator was placed in a glass ampoule equipped with a magnetic stirrer, 10.0 g (0.0205 mol) of perfluoro (4-methyl-2-methylene-1,3-dioxolane) as a monomer, 40.0 g of ZEORORA-H (manufactured by Nippon Zeon Co., Ltd., 1,2,2,3,3,4,4-heptafluorocyclopentane) as a polymerization solvent, and 1.111 g (0.00931 mol) of chloroform (manufactured by Wako Pure Chemical Industries, Ltd.) as a chain transfer agent were added, and the ampoule was sealed under reduced pressure after repeating nitrogen substitution by freeze degassing and depressurization (amount of chain transfer agent: 10% by weight based on the total of monomer and chain transfer agent). Precipitation polymerization was carried out by holding at 55° C. for 24 h while stirring with the magnetic stirrer in an upright state of the ampoule. As a result, a cloudy slurry was obtained in which the resin was precipitated in the polymerization solvent. After cooling to room temperature, the ampoule was opened, and the liquid including the produced resin particles was filtered off, washed with acetone, and vacuum dried to obtain particulate perfluoro (4-methyl-2-methylene-1,3-dioxolane) resin (yield: 82%).

The weight average molecular weight of the obtained fluororesin was $9.6 \times 10^4$, and the molecular weight distribution Mw/Mn was 2.6.

Comparative Example 1-3

A solution obtained by diluting 0.52 g (0.0012 mol) of $(CF_3CF_2CF_2COO)_2$ as an initiator with 52 g of FC-72 and 30.0 g (0.12 mol) of perfluoro(4-methyl-2-methylene-1,3-dioxolane) as a monomer were put in a glass ampoule having a capacity of 75 mL, and after repeated nitrogen replacement and depressurization by freeze degassing, the ampoule was fusion-sealed under reduced pressure. The ampoule was held at 25° C. for 24 h to carry out radical polymerization. The ampoule was opened, the contents were placed under stirring in a beaker including 600 g of hexane, the solid matter was collected by filtration, washed twice with acetone, and vacuum dried to obtain a lump-like perfluoro (4-methyl-2-methylene-1,3-dioxolane) resin (yield 18%). Table 1 shows the evaluation results of the fluororesin. The weight average molecular weight of the obtained fluororesin was $86 \times 10^4$, and the molecular weight distribution Mw/Mn was 26.2. The yield was very low and the molecular weight distribution was very large.

Comparative Example 1-4

A total of 4.8 g (0.020 mol) of perfluoro (4-methyl-2-methylene-1,3-dioxolane) as a monomer, 3 mL of dichloropentafluoropropane (manufactured by AGC Inc., AK-225) as a solvent, 0.21 g of ammonium perfluorooctanoate as an emulsifier, 0.24 g of $Na_2HPO_4 \cdot 7H_2O$ as a pH adjuster, 0.15 g of $(NH_4)_2S_2O_8$ as an initiator, and 50 mL of distilled water degassed with $N_2$ as a solvent were loaded into a glass tube for polymerization equipped with a stirrer. After purging the head space present above the solution with $N_2$, a slight $N_2$ pressurization was applied. Next, the contents of this tube were heated at 75° C. for 5 h while stirring with a stirrer. The resulting reaction mixture was treated with 80 mL of aqueous HCl solution (6.3 M) to precipitate the polymer. This polymer was washed 3 times with 200 mL of distilled water and then 3 times with 200 mL of acetone. Next, this polymer was placed in a vacuum oven and dried under vacuum (150 mm Hg) at 150° C. for 24 h to obtain a white powdery polymer (yield: 3%). The abovementioned operations from polymerization to drying were separately performed twice, and the obtained polymers were mixed to obtain a polymer for evaluation. The evaluation results of the obtained polymer are shown in Table 2. The weight average molecular weight of the obtained fluororesin was $34 \times 10^4$, and the molecular weight distribution Mw/Mn was 25. The yield was very low and the molecular weight distribution was very large. When the solid-state $^{19}$F-NMR measurement of the fluororesin was carried out, peaks showing maximums at −140 ppm to −142 ppm and −143 ppm to −145 ppm were not detected.

Comparative Example 1-5

A total of 10.0 g (0.041 mol) of perfluoro(4-methyl-2-methylene-1,3-dioxolane) as a monomer, 35 g of AK-225 as a solvent, and 0.02 g of 4,4-bis(t-butylcyclohexyl) peroxydicarbonate (manufactured by NOF Corporation, PEROYL TCP) as an initiator were loaded in a glass ampoule having a capacity of 75 mL. After repeated nitrogen replacement and depressurization by freeze degassing, the ampoule was fusion-sealed under reduced pressure. The ampoule was heated at 60° C. for 3 h under shaking with a constant-temperature shaker. The polymer taken out from this ampoule was dried under vacuum (150 mm Hg) at 100° C. for 24 h to obtain a polymer (yield: 76%). The abovementioned operations from polymerization to drying were separately performed twice, and the obtained polymers were mixed to obtain a polymer for evaluation. The evaluation results of the obtained polymer are shown in Table 2. The weight average molecular weight of the obtained fluororesin was $12 \times 10^4$, and the molecular weight distribution Mw/Mn was 1.8. When the solid-state $^{19}$F-NMR measurement of the fluororesin was carried out, peaks showing maximums at −140 ppm to −142 ppm and −143 ppm to −145 ppm were not detected.

Comparative Example 1-6

When the solid-state $^{19}$F-NMR measurement of the fluororesin obtained in Comparative Example 1-2 was carried out, peaks showing maximums at −140 ppm to −142 ppm and −143 ppm to −145 ppm were not detected.

Comparative Example 1-7

When the solid-state $^{19}$F-NMR measurement of the fluororesin obtained in Comparative Example 1-3 was carried out, peaks showing maximums at −140 ppm to −142 ppm and −143 ppm to −145 ppm were not detected.

TABLE 1

| | Example 1-1 | Example 1-2 | Comparative Example 1-1 | Comparative Example 1-2 | Comparative Example 1-3 |
|---|---|---|---|---|---|
| Radical polymerization initiator *[1] | A | A | B | B | C |
| Presence/absence of peaks showing maximums at −140 ppm to −142 ppm and −143 ppm to −145 ppm | Present | —*[2] | Absent | —*[2] | —*[2] |
| Weight average molecular weight Mw × $10^{-4}$ | 9.5 | 8.8 | 21 | 9.6 | 86 |
| Molecular weight distribution Mw/Mn | 3.7 | 2.4 | 2.8 | 2.6 | 26.2 |
| Yellowness index (YI) of thick melt-molded product (φ10 mm × H17 mm, in test tube, 280° C., 24 h) | 1.4 | 1.3 | 57 | 46 | 4.8 |
| Yellowness index (YI) of flaky melt-molded product (thickness 3 mm, 280° C., 24 h in a petri dish) | —*[2] | —*[2] | —*[2] | 1.9 | —*[2] |
| Yield (%) | 93 | 90 | 94 | 82 | 18 |

*[1] Symbols of the radical polymerization initiator in the table represent the following:
A: bis(perfluorocyolohexyl carbonyl) peroxide
B: bis(2,3,4,5,6-pentafluorobenzoyl) peroxide
C: $(CF_3CF_2CF_2COO)_2$
*[2] "—" represents "Not measured"

TABLE 2

| | Comparative Example 1-4 | Comparative Example 1-5 |
|---|---|---|
| Radical polymerization initiator *[1] | D | E |
| Presence/absence of peaks showing maximums at −140 ppm to −142 ppm and −143 ppm to −145 ppm | Absent | Absent |
| Weight average molecular weight Mw × $10^{-4}$ | 34 | 12 |
| Molecular weight distribution Mw/Mn | 25 | 1.8 |
| Yellowness index (YI) of thick melt-molded product (φ10 mm × H17 mm, in test tube, 280° C., 24 h) | >5 *[2] | 40 |
| Yield (%) | 3 | 76 |

*[1] Symbols of the radical polymerization initiator in the table represent the following:
D: $(NH_4)_2S_2O_8$
E: 4,4-bis(t-butylcyclohexyl) peroxydicarbonate
*[2] Evaluation result for a sample-amount of 100 mg inside a φ5 mm glass NMR tube Reference Example 1-1

The resin particles obtained in Example 1-2 were immersed in 10 times the amount of various solvents at 50° C. for 5 h, and it was visually observed whether the resin particles remained.

The following organic solvents were confirmed with the naked eye to have residual resin particles:

1,1,2,2-tetrafluoroethyl-2,2,2-trifluoroethyl ether, 2,2,2-trifluoroethanol, 1,1,1,3,3,3-hexafluoroisopropanol, 1,2,2,3,3,4,4-heptafluorocyclopentane, and chloroform.

Then, the resin particles were taken out by cooling to 25° C., filtering through a filter, and rinsing with the solvent, and the resin particles were thereafter washed twice with 10 times the amount of acetone, and vacuum dried. The recovery rate determined from the dry weight was 90% or more in each case. Further, when the filtrate obtained above was distilled off and the solid fraction amount in the filtrate was determined, the solid fraction amount in the filtrate was less than 10% with respect to the resin particles used. From the above results, it was confirmed that the weight reduction rate of the resin weight was less than 10 wt %.

For the fluororesin according to the first aspect of the present invention, as shown in Examples 1-1 and 1-2, the yellowness index of a thick melt-molded product (($\varphi$10 mm×H17 mm, in test tube, 280° C., 24 h) is small and yellowing is suppressed even in a thick molded body as compared with Comparative Examples 1-1 to 1-3.

The method for producing a fluororesin according to the first aspect of the present invention has a higher yield than the method of Comparative Example 1-3 and, as shown in Examples 1-1 and 1-2, makes it possible to produce the fluororesin at a yield of 80% or more, and depending on the conditions, at a yield of 85% or more and also 90% or more.

The fluororesin obtained by the method for producing a fluororesin according to the first aspect of the present invention has an improved yellowness index of a product heated at 280° C. for 24 h in a test tube and a narrow molecular weight distribution as compared with the method of Comparative Example 1-3, and it is possible to produce a fluororesin having a molecular weight distribution Mw/Mn of 5 or less, and depending on the conditions, 4 or less and also 3 or less.

The following Examples 2-1 and 2-2, Comparative Examples 2-1 to 2-3, and Reference Examples 2-1 and 2-2 are Examples, Comparative Examples, and Reference Examples relating to the second aspect of the present invention.

Example 2-1

A total of 0.133 g (0.000205 mol) of bis(perfluorocyclohexyl carbonyl) peroxide as an initiator, 10.0 g (0.0410 mol) of perfluoro(4-methyl-2-methylene-1,3-dioxolane) as a monomer, and 40.0 g of FC-72 as a polymerization solvent were loaded in a glass ampoule having a capacity of 75 mL, and after repeated nitrogen substitution and depressurization by freeze degassing, the ampoule was sealed under reduced pressure (monomer:solvent=20/80 (wt:wt)). The ampoule was placed in a thermostat at 55° C. and held for 24 h to carry out radical solution polymerization to obtain a viscous liquid in which the resin was dissolved. After cooling to room temperature, the ampoule was opened, and the obtained resin solution was diluted with 50 g of FC-72 for viscosity adjustment to prepare a resin diluted solution. A total of 240 g of ZEORORA H (1,2,2,3,3,4,4-heptafluorocyclopentane manufactured by Zeon Corporation) was placed in a beaker equipped with a stirrer, and the resin diluted solution was added to the beaker under stirring to precipitate the resin. The precipitated resin was collected by filtration, washed with acetone twice, and vacuum dried to obtain a powdery perfluoro(4-methyl-2-methylene-1,3-dioxolane) resin (yield 93%). The weight average molecular weight of the obtained fluororesin was $8.6\times10^4$, and the molecular weight distribution Mw/Mn was 3.5. No peak was observed at −150 ppm to 170 ppm and a fluorine-containing aromatic ring such as a pentafluorophenyl group was not detected by the solid-state $^{19}$F-NMR. The evaluation results of the obtained fluororesin are shown in Table 3 and FIGURE.

Example 2-2

A solution in which 0.0266 g (0.000041 mol) of bis(perfluorocyclohexyl carbonyl) peroxide as an initiator was dissolved in 2.7 g of FC-72, 10.0 g (0.0410 mol) of perfluoro(4-methyl-2-methylene-1,3-dioxolane) as a monomer, 37.3 g of ZEORORA-H (1,2,2,3,3,4,4-heptafluorocyclopentane manufactured by Zeon Corporation) as a polymerization solvent, and 1.111 g (0.00931 mol) of chloroform (manufactured by Wako Pure Chemical Industries, Ltd.) as a chain transfer agent were placed in a glass ampoule having a diameter of 30 mm and equipped with a magnetic stirring member, and after repeated nitrogen substitution and depressurization, the ampoule was fusion-sealed under reduced pressure (amount of the chain transfer agent was 10 wt % based on the total of the monomer and the chain transfer agent). Precipitation polymerization was carried out by holding at 40° C. for 24 h while stirring the magnetic stirring member with a stirrer in an upright state of the ampoule, thereby obtaining a white turbid slurry in which the resin precipitated in the polymerization solvent. After cooling to room temperature, the ampoule was opened, the liquid including the generated resin particles was filtered off, followed by washing with acetone and vacuum drying to obtain a powdered perfluoro(4-methyl-2-methylene-1,3-dioxolane) resin (yield: 90%). The weight average molecular weight of the obtained fluororesin was $9.2\times10^4$, and the molecular weight distribution Mw/Mn was 2.7. The volume average particle diameter of the obtained fluororesin was 18 μm, and the flowability of the powder was excellent and superior to that of Example 2-1. No peak was observed at −150 ppm to 170 ppm, and a fluorine-containing aromatic ring such as a pentafluorophenyl group was not detected by solid-state $^{19}$F-NMR. The evaluation results of the obtained fluororesin are shown in Table 3 and FIGURE.

Comparative Example 2-1

A total of 0.0865 g (0.000205 mol) of bis(2,3,4,5,6-pentafluorobenzoyl) peroxide as an initiator, 10.0 g (0.0205 mol) of perfluoro(4-methyl-2-methylene-1,3-dioxolane) as a monomer, 40.0 g of ZEORORA-H (1,2,2,3,3,4,4-heptafluorocyclopentane manufactured by Zeon Corporation) as a polymerization solvent, and 1.111 g (0.00931 mol) of chloroform (manufactured by Wako Pure Chemical Industries, Ltd.) as a chain transfer agent were placed in a glass ampoule having a diameter of 30 mm and equipped with a magnetic stirring member, and after repeated nitrogen substitution and depressurization, the ampoule was fusion-sealed under reduced pressure (amount of the chain transfer agent was 10 wt % based on the total of the monomer and the chain transfer agent). Precipitation polymerization was carried out by holding at 55° C. for 24 h while stirring the magnetic stirring member with a stirrer in an upright state of the ampoule, thereby obtaining a white turbid slurry in which the resin precipitated in the polymerization solvent. After cooling to room temperature, the ampoule was opened, the liquid including the generated resin particles was filtered off, followed by washing with acetone and vacuum drying to obtain a powdered perfluoro(4-methyl-2-methylene-1,3-dioxolane) resin (yield: 81%). The weight average molecular weight of the obtained fluororesin was 9.8×10⁴, and the molecular weight distribution Mw/Mn was 2.6. By solid-state ¹⁹F-NMR, a peak derived from a pentafluorophenyl group (fluorine-containing aromatic ring) was confirmed at −163 ppm. The evaluation results of the obtained fluororesin are shown in Table 3 and FIGURE.

Comparative Example 2-2

A total of 4.8 g (0.020 mol) of perfluoro (4-methyl-2-methylene-1,3-dioxolane) as a monomer, 3 mL of dichloropentafluoropropane (manufactured by AGC Inc., AK-225) as a solvent, 0.21 g of ammonium perfluorooctanoate as an emulsifier, 0.24 g of $Na_2HPO_4·7H_2O$ as a pH adjuster, 0.15 g of $(NH_4)_2S_2O_8$ as an initiator, and 50 mL of distilled water degassed with $N_2$ as a solvent were loaded into a glass tube for polymerization equipped with a stirrer. After purging the head space present above the solution with $N_2$, a slight $N_2$ pressurization was applied. Next, the contents of this tube were heated at 75° C. for 5 h while stirring with the stirrer. The resulting reaction mixture was treated with 80 mL of aqueous HCl solution (6.3 M) to precipitate the polymer. This polymer was washed 3 times with 200 mL of distilled water and then 3 times with 200 mL of acetone. Next, this polymer was placed in a vacuum oven and dried under vacuum (150 mm Hg) at 150° C. for 24 h to obtain a white powdery polymer (yield: 3%). The abovementioned operations from polymerization to drying were separately performed twice, and the obtained polymers were mixed to obtain a polymer for evaluation. The evaluation results of the obtained polymer are shown in Table 4. The weight average molecular weight of the obtained fluororesin was 34×10⁴, and the molecular weight distribution Mw/Mn was 25. The yield was very low and the molecular weight distribution was very large.

Comparative Example 2-3

A total of 10.0 g (0.041 mol) of perfluoro (4-methyl-2-methylene-1,3-dioxolane) as a monomer, 35 g of AK-225 as a solvent, and 0.02 g of 4,4-bis(t-butylcyclohexyl) peroxydicarbonate (manufactured by NOF Corporation, PEROYL TCP) as an initiator were loaded in a glass ampoule having a capacity of 75 mL. After repeated nitrogen replacement and depressurization by freeze degassing, the ampoule was fusion-sealed under reduced pressure. The ampoule was heated at 60° C. for 3 h under shaking with a constant-temperature shaker. The polymer taken out from this ampoule was dried under vacuum (150 mm Hg) at 100° C. for 24 h to obtain a polymer (yield: 76%). The abovementioned operations from polymerization to drying were separately performed twice, and the obtained polymers were mixed to obtain a polymer for evaluation. The evaluation results of the obtained polymer are shown in Table 4. The weight average molecular weight of the obtained fluororesin was 12×10⁴, and the molecular weight distribution Mw/Mn was 1.8.

TABLE 3

|  | Example 2-1 | Example 2-2 | Comparative Example 2-1 |
|---|---|---|---|
| Transmittance (%) of 10 wt % solution of fluororesin at a wavelength of 275 nm *¹ | 97.4 | 95.4 | 5.4 |

TABLE 3-continued

|  | Example 2-1 | Example 2-2 | Comparative Example 2-1 |
|---|---|---|---|
| Presence/absence of peak showing a minimum of transmittance of 10 wt % solution of fluororesin at a wavelength of 250-300 nm *¹ | Absent | Absent | Present |
| Yellowness index (YI) of thick melt-molded product (φ10 mm × H17 mm, in test tube, 280° C., 24 h) | 1.6 | 1.8 | 49 |
| Yellowness index (YI) of flaky melt-molded product (thickness 3 mm, 280° C., 24 h in a petri dish) | —*² | —*² | 1.9 |

*¹ Solvent: perfluorohexane, optical path length: 10 mm
*² Not measured

TABLE 4

|  | Comparative Example 2-2 | Comparative Example 2-3 |
|---|---|---|
| Transmittance (%) of 10 wt. % solution of fluororesin at a wavelength of 275 nm *¹ | 14.9 *² | 34.2 |
| Presence/absence of peak showing a minimum of transmittance of 10 wt % solution of fluororesin at a wavelength of 250-300 nm *¹ | Absent | Absent |
| Yellowness index (YI) of thick melt-molded product (φ10 mm × H17 mm, in test tube, 280° C., 24 h} | >5 *³ | 40 |

*¹ Solvent: perfluorohexane, optical path length: 10 mm
*² Measurement result obtained with 1 wt % perfluorohexane solution of fluororesin
*³ Evaluation result for a sample amount of 100 mg in φ5 mm glass NMR tube Reference Example 2-1

A solution obtained by diluting 0.52 g (0.0012 mol) of $(CF_3CF_2CF_2COO)_2$ as an initiator with 52 g of FC-72 was put in a glass ampoule having a capacity of 75 mL, 30.0 g (0.12 mol) of perfluoro(4-methyl-2-methylene-1,3-dioxolane) as a monomer was added, and after repeated nitrogen replacement and depressurization by freeze degassing, the ampoule was fusion-sealed under reduced pressure. The ampoule was held at 25° C. for 24 h to carry out radical polymerization. The ampoule was opened, the contents were placed under stirring in a beaker including 600 g of hexane, and the solid matter was collected by filtration, washed twice with acetone, and vacuum dried to obtain a lump-like perfluoro(4-methyl-2-methylene-1,3-dioxolane) resin (yield 17%). The weight average molecular weight of the obtained fluororesin was 83×10⁴, and the molecular weight distribution Mw/Mn was 25. The yield was very low and the molecular weight distribution was very large.

Reference Example 2-2

The resin particles obtained in Example 2-2 were immersed in 10 times the amount of various solvents at 50° C. for 5 h, and it was visually observed whether the resin particles remained.

The following organic solvents were confirmed with the naked eye to have residual resin particles:
1,1,2,2-tetrafluoroethyl-2,2,2-trifluoroethyl ether, 2,2,2-trifluoroethanol, 1,1,1,3,3,3-hexafluoroisopropanol, 1,2,2,3,3,4,4-heptafluorocyclopentane, and chloroform.

Then, the resin particles were taken out by cooling to 25° C., filtering through a filter, and rinsing with the solvent, and the resin particles were thereafter washed twice with 10 times the amount of acetone, and vacuum dried. The recovery rate determined from the dry weight was 90% or more in each case. Further, when the filtrate obtained above was distilled off and the solid fraction amount in the filtrate was determined, the solid fraction amount in the filtrate was less than 10% with respect to the resin particles used. From the above results, it was confirmed that the weight reduction rate of the resin weight was less than 10 wt %.

For the fluororesin according to the second aspect of the present invention, as shown in Examples 2-1 and 2-2, the yellowness index of a thick melt-molded product (($\varphi$10 mm×H17 mm, in test tube, 280° C., 24 h) is small and yellowing when molding a thick molded product is suppressed as compared with Comparative Example 2-1.

The method for producing a fluororesin according to the second aspect of the present invention has a higher yield than the method of Reference Example 2-1, and as shown in Examples 1-1 and 1-2, makes it possible to produce the fluororesin at a yield of 80% or more, and depending on the conditions, at a yield of 85% or more and also 90% or more.

The fluororesin obtained by the method for producing a fluororesin according to the second aspect of the present invention has an improved yellowness index of a product heated at 280° C. for 24 h in a test tube and a narrow molecular weight distribution as compared with the method of Reference Example 2-1, and it is possible to produce a fluororesin having a molecular weight distribution Mw/Mn of 5 or less, and depending on the conditions, 4 or less and also 3 or less.

INDUSTRIAL APPLICABILITY

Both the first aspect and the second aspect of the present invention are useful in the field related to fluororesins.

The invention claimed is:

1. A method for producing a fluororesin, comprising:
polymerizing a mixture including a radical polymerization initiator and a monomer to produce the fluororesin including a residue unit of a formula (1) and a terminal group of a formula (2),
wherein the fluororesin has a weight average molecular weight Mw of from $5 \times 10^4$ to $9.5 \times 10^4$, and a molecular weight distribution Mw/Mn, which is a ratio of the weight average molecular weight Mw to a number average molecular weight Mn, of from 1.2 to 8,

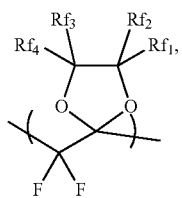
(1)

wherein in the formula (1), $Rf_1$, $Rf_2$, $Rf_3$ and $Rf_4$ each independently represent one of the groups consisting of a fluorine atom, a linear perfluoroalkyl group having 1 to 7 carbon atoms, a branched perfluoroalkyl group having 3 to 7 carbon atoms, and a cyclic perfluoroalkyl group having 3 to 7 carbon atoms, the perfluoroalkyl group may have an ethereal oxygen atom, $Rf_1$, $Rf_2$, $Rf_3$ and $Rf_4$ may be linked to each other to form a ring having 4 or more and 8 or less carbon atoms, and the ring may include an ethereal oxygen atom,

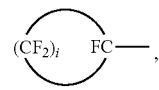
(2)

wherein in the formula (2), i is an integer of 3 to 20, the radical polymerization initiator has a formula (4):

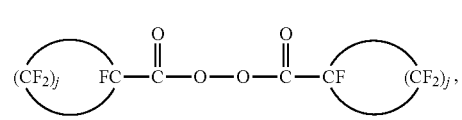
(4)

wherein in the formula (4), j is an integer of 3 to 20, and the monomer has a formula (5):

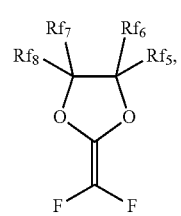
(5)

wherein in the formula (5), $Rf_5$, $Rf_6$, $Rf_7$, and $Rf_8$ each independently represent one of the groups consisting of a fluorine atom, a linear perfluoroalkyl group having 1 to 7 carbon atoms, a branched perfluoroalkyl group having 3 to 7 carbon atoms, and a cyclic perfluoroalkyl group having 3 to 7 carbon atoms, the perfluoroalkyl group may have an ethereal oxygen atom, $Rf_5$, $Rf_6$, $Rf_7$, and $Rf_8$ may be linked to each other to form a ring having 4 or more and 8 or less carbon atoms, and the ring may include an ethereal oxygen atom.

2. The method according to claim 1, wherein the radical polymerization initiator has a formula (6):

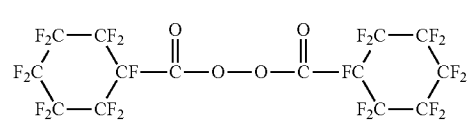
(6)

3. The method according to claim 1, wherein
in the polymerizing, the mixture is further mixed with an organic solvent, and
in the organic solvent, at least the monomer is dissolved and at least a part of the resin produced by the polymerization is not dissolved, resulting in precipitation of the resin, and the resin produced by the polymerization precipitates as particles in the organic solvent.

4. A method for producing a fluororesin, comprising:
polymerizing a mixture including a radical polymerization initiator and a monomer to produce the fluororesin including a residue unit of a formula (1), and when dissolved in perfluorohexane to obtain a 10 wt % perfluorohexane solution, having a transmittance of at least 50% as measured at an optical path length thereof of 10 mm and a wavelength of 275 nm,
wherein the fluororesin has a weight average molecular weight Mw of from $5 \times 10^4$ to $9.5 \times 10^4$, and a molecular weight distribution Mw/Mn, which is a ratio of the weight average molecular weight Mw to a number average molecular weight Mn, of from 1.2 to 8,

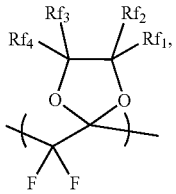

(1)

wherein in the formula (1), $Rf_1$, $Rf_2$, $Rf_3$ and $Rf_4$ each independently represent one of the groups consisting of a fluorine atom, a linear perfluoroalkyl group having 1 to 7 carbon atoms, a branched perfluoroalkyl group having 3 to 7 carbon atoms, and a cyclic perfluoroalkyl group having 3 to 7 carbon atoms, the perfluoroalkyl group may have an ethereal oxygen atom, $Rf_1$, $Rf_2$, $Rf_3$ and $Rf_4$ may be linked to each other to form a ring having 4 or more and 8 or less carbon atoms, and the ring may include an ethereal oxygen atom,
the radical polymerization initiator has a formula (2):

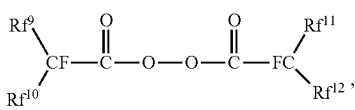

(2)

wherein in the formula (2), $Rf^9$, $Rf^{10}$, $Rf^{11}$, and $Rf^{12}$ each independently represent a perfluoroalkyl group having 1 to 20 carbon atoms, the perfluoroalkyl group may have an ethereal oxygen atom, $Rf^9$ and $Rf^{10}$ may be linked to each other to form a ring having 4 or more and 20 or less carbon atoms, $Rf^{11}$ and $Rf^{12}$ may be linked to each other to form a ring having 4 or more and 20 or less carbon atoms, and the ring may include an ethereal oxygen atom, and the monomer has a formula (3):

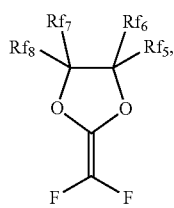

(3)

wherein in the formula (3), $Rf_5$, $Rf_6$, $Rf_7$ and $Rf_8$ each independently represent one of the groups consisting of a fluorine atom, a linear perfluoroalkyl group having 1 to 7 carbon atoms, a branched perfluoroalkyl group having 3 to 7 carbon atoms, and a cyclic perfluoroalkyl group having 3 to 7 carbon atoms, the perfluoroalkyl group may have an ethereal oxygen atom, $Rf_5$, $Rf_6$, $Rf_7$ and $Rf_8$ may be linked to each other to form a ring having 4 or more and 8 or less carbon atoms, and the ring may include an ethereal oxygen atom.

5. The method according to claim 4, wherein the radical polymerization initiator has a formula (4):

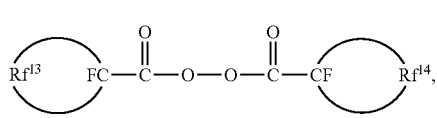

(4)

wherein in the formula (4), $Rf^{13}$ and $Rf^{14}$ each independently represent a perfluoroalkyl group having 3 to 20 carbon atoms, and the perfluoroalkyl group may have an ethereal oxygen atom.

6. The method according to claim 1, wherein
in the polymerizing, the mixture is further mixed with an organic solvent, and
in the organic solvent, at least the monomer is dissolved and at least a part of the resin produced by the polymerization is not dissolved, resulting in precipitation of the resin, and the resin produced by the polymerization precipitates as particles in the organic solvent.

* * * * *